United States Patent
Sano et al.

(10) Patent No.: US 8,355,637 B2
(45) Date of Patent: Jan. 15, 2013

(54) OPTICAL OFDM RECEIVER, OPTICAL TRANSMISSION SYSTEM, SUBCARRIER SEPARATION CIRCUIT, AND SUBCARRIER SEPARATION METHOD

(75) Inventors: Akihide Sano, Yokosuka (JP); Eiichi Yamada, Yokosuka (JP); Takayuki Kobayashi, Yokosuka (JP); Koichi Ishihara, Yokosuka (JP); Yutaka Miyamoto, Yokosuka (JP); Riichi Kudo, Yokosuka (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 352 days.

(21) Appl. No.: 12/865,827

(22) PCT Filed: Feb. 20, 2009

(86) PCT No.: PCT/JP2009/053076
§ 371 (c)(1),
(2), (4) Date: Aug. 2, 2010

(87) PCT Pub. No.: WO2009/104758
PCT Pub. Date: Aug. 27, 2009

(65) Prior Publication Data
US 2011/0002689 A1    Jan. 6, 2011

(30) Foreign Application Priority Data

Feb. 22, 2008 (JP) ................................. 2008-041306
Sep. 19, 2008 (JP) ................................. 2008-241489

(51) Int. Cl.
*H04B 10/06* (2006.01)
(52) U.S. Cl. .......... 398/204; 398/202; 398/208; 398/76; 398/65
(58) Field of Classification Search ................. 398/208, 398/204, 202, 65, 69, 79, 44, 76
See application file for complete search history.

(56) References Cited

U.S. PATENT DOCUMENTS
5,537,634 A * 7/1996 Fye .................................. 398/76
(Continued)

FOREIGN PATENT DOCUMENTS
JP         11-041197 A        2/1999
(Continued)

OTHER PUBLICATIONS

Kobayashi, T., et al., "Electro-optically multiplexed 110 Gbit/s optical OFDM signal transmission over 80 km SMF without dispersion compensation," Electronics Letters, vol. 44, No. 3, The Institution of Engineering and Technology, Jan. 31, 2008, pp. 225-226.
Yamada, Eiichi et al., No-guard-interval PDM CO-OFDM transmission in 4.1 Tb/s (50 × 88.8-Gb/s) DWDM link over 800 km SMF including 50-GHz spaced ROADM nodes, IEICE, 2008, with English translation.
(Continued)

*Primary Examiner* — Kenneth N Vanderpuye
(74) *Attorney, Agent, or Firm* — Harness, Dickey & Pierce, P.L.C.

(57) ABSTRACT

A high-performance optical OFDM receiver is realized. A subcarrier separation circuit receives an optical OFDM signal consisting of two subcarriers A and B and separates a subcarrier component, signal light and first local oscillator light are input to the subcarrier separation circuit, the subcarrier separation circuit converts the signal light and the first local oscillator into a baseband electrical signal, the subcarrier separation circuit converts the baseband electrical signal into a digital signal, the subcarrier separation circuit shifts the frequency of the converted digital signal so that a center frequency of the subcarrier A becomes zero, and the subcarrier separation circuit adds a frequency shifted signal to a signal obtained by delaying the frequency shifted signal by ½ of a symbol time to separate a component of the subcarrier A.

22 Claims, 24 Drawing Sheets

U.S. PATENT DOCUMENTS

| | | | | |
|---|---|---|---|---|
| 5,546,190 | A | * | 8/1996 | Hill et al. .................. 398/76 |
| 5,717,722 | A | * | 2/1998 | Mori ...................... 375/326 |
| 6,195,534 | B1 | | 2/2001 | Sakoda et al. |
| 6,563,881 | B1 | | 5/2003 | Sakoda et al. |
| 6,816,555 | B2 | * | 11/2004 | Sakoda ................... 375/260 |
| 8,031,586 | B2 | * | 10/2011 | Safar ..................... 370/210 |
| 8,086,113 | B2 | * | 12/2011 | Nakashima et al. .......... 398/206 |
| 8,233,797 | B2 | * | 7/2012 | Qian et al. ................. 398/67 |
| 2004/0090283 | A1 | * | 5/2004 | Naito ..................... 333/17.2 |
| 2007/0053457 | A1 | * | 3/2007 | Sakoda ................... 375/260 |
| 2007/0121745 | A1 | * | 5/2007 | Zuckerman et al. .......... 375/260 |
| 2008/0145066 | A1 | * | 6/2008 | Hoshida .................. 398/205 |
| 2009/0047030 | A1 | * | 2/2009 | Hoshida .................. 398/205 |
| 2010/0080560 | A1 | * | 4/2010 | Mertz .................... 398/76 |
| 2010/0150577 | A1 | * | 6/2010 | Essiambre et al. .......... 398/188 |
| 2010/0189445 | A1 | * | 7/2010 | Nakashima et al. .......... 398/152 |
| 2010/0196009 | A1 | * | 8/2010 | Qian et al. ................. 398/65 |

FOREIGN PATENT DOCUMENTS

| | | | |
|---|---|---|---|
| JP | 2000-092009 | A | 3/2000 |
| JP | 2000-332722 | A | 11/2000 |
| JP | 2001-308818 | A | 11/2001 |
| JP | 2003-051810 | A | 2/2003 |
| JP | 3789784 | B2 | 6/2006 |

OTHER PUBLICATIONS

Yamada, E. et al., 1 Tb/s (111Gb/s/ch × 10ch) no-guard-interval CO-OFDM transmission over 2100 km DSF, Electonics Letters, vol. 44, Nov. 20, 2008, pp. 1417-1418.

Sano, A. et al., 13.4-Tb/s (134 × 111 Gb/s/ch) no-guard-interval coherent OFDM transmission over 3,600 km of SMF with 19-ps average PMD, Optical Communication, 2008. ECOC 2008. 34th European Conference on, Sep. 21, 2008, pp. 1-2.

Sano, A. et al., Ultra-high speed optical OFDM transmission technologies, Optical Internet, 2008. COIN 2008. 7th International Conference on, Oct. 14, 2008, pp. 1-2.

Kudo, R. et al., Single carrier transmission with two-stage overlap frequency domain equalisation for long-haul optical systems, Electronics Letters, vol. 45, Jan. 29, 2009, pp. 180-182.

Jansen, et al., "16×52.5-Gb/s, 50-GHz spaced, POLMUX-CO-OFDM transmission over 4,160 km of SSMF enabled by MIMO processing", ECOC2007, PD1.3, Berlin, Germany, 2007.

Sano, A. et al., "30×100-Gb/s all-optical OFDM transmission over 1300 km SMF with 10 ROADM nodes", ECOC2007, PD1.7, Berlin, Germany 2007.

* cited by examiner

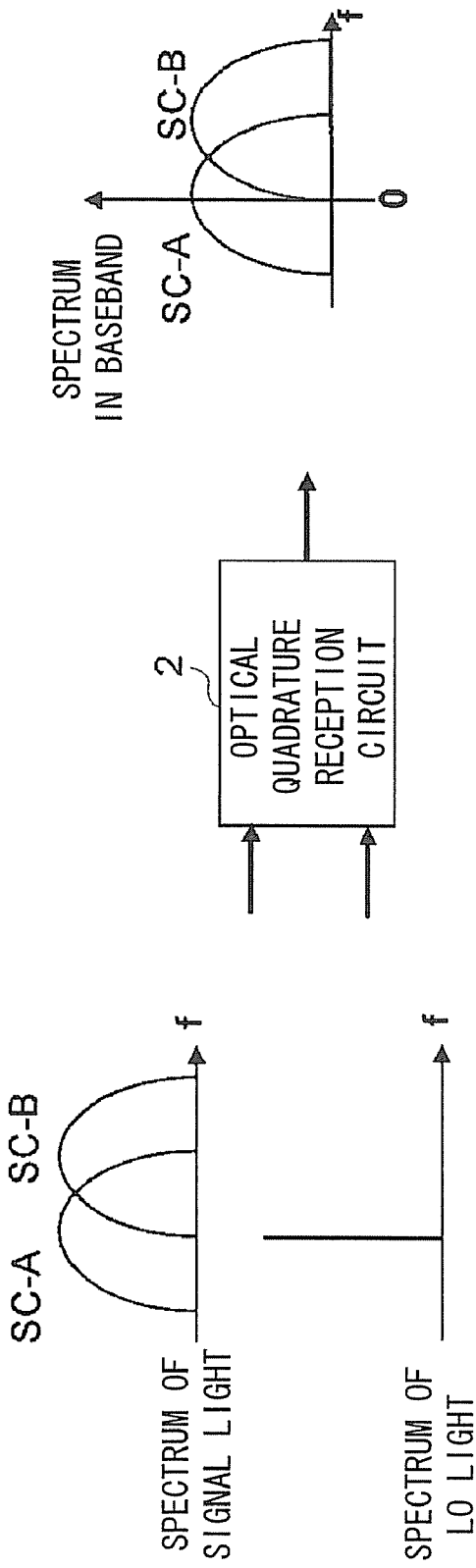

OPTICAL OFDM RECEIVER, OPTICAL TRANSMISSION SYSTEM, SUBCARRIER SEPARATION CIRCUIT, AND SUBCARRIER SEPARATION METHOD

CROSS-REFERENCE TO RELATED APPLICATIONS

This application is a 371 U.S. National Stage of International Application No. PCT/JP2009/053076, filed Feb. 20, 2009. This application claims the benefit of Japanese Patent Applications No. 2008-041306, filed Feb. 22, 2008 and No. 2008-241489, filed Sep. 19, 2008. The entire disclosures of the above applications are incorporated herein by reference.

TECHNICAL FIELD

The present invention relates to optical communications. In particular, the present invention relates to an optical OFDM (orthogonal frequency division multiplexing) receiver of an optical OFDM transmission system, an optical transmission system, a subcarrier separation circuit, and a subcarrier separation method.

Priority is claimed on Japanese Patent Application No. 2008-041306, filed Feb. 22, 2008, and Japanese Patent Application No. 2008-241489, filed Sep. 19, 2008, the contents of which are incorporated herein by reference.

BACKGROUND ART

Although high-capacity optical transmission systems are desired because of an increase in traffic in the Internet or the like, the band over which transmission through optical fibers is possible is currently used up to approximately a limit, and thus transmission schemes that are capable of transferring a greater amount of information over the same transmission band and that provide high spectral efficiency are being demanded. Even in the state in which signals of adjacent channels overlap with each other, OFDM (Orthogonal Frequency Division Multiplexing) can transfer the signals without interference by taking advantage of the orthogonality of optical frequencies, it can increase spectral efficiency, and thus it is expected as a next-generation optical communication scheme.

As a method for receiving optical OFDM signals, coherent reception is performed and subcarriers are separated using a technique employed in wireless technology (refer to, for example, non-patent document 1). In addition, as another method for receiving optical OFDM signals, a method is performed in which subcarriers are separated in the optical domain using a Mach-Zehnder delay-interferometer and direct reception (square-law detection) is performed (refer to, for example, patent document 1 and non-patent document 2).

[Non-Patent Document 1] S. L. Jansen, I. Morita, and H. Tanaka, "16×52.5-Gb/s, 50-GHz spaced, POLMUX-CO-OFDM transmission over 4,160 km of SSMF enabled by MIMO processing", ECOC2007, PD1.3, Berlin, Germany

[Patent Document 1] Japanese Patent No. 3789784

[Non-Patent Document 2] A. Sano, H. Masuda, E. Yoshida, T. Kobayashi, E. Yamada, Y. Miyamoto, F. Inuzuka, Y. Hibino, Y. Takatori, K. Hagimoto, T. Yamada, and Y. Sakamaki, "30×100-Gb/s all-optical OFDM transmission over 1300 km SMF with 10 ROADM nodes", ECOC2007, PD1.7, Berlin, Germany

DISCLOSURE OF INVENTION

Problems to be Solved by the Invention

In the non-patent document 1, optical OFDM signals are received in accordance with a scheme similar to that of radio. For this reason, there is a problem in that signals other than data of information, such as guard intervals and training signals, must also be transmitted, so that a transmission rate is increased by 10% to 20%. As a result, in addition to an increase in speed required for electrical circuits, the signal band is broadened, and spectral efficiency is deteriorated compared to the case in which only data of information is transmitted.

Moreover, since the schemes of the patent document 1 and the non-patent document 2 use direct reception of light, the receiver sensitivity is inferior to that of coherent reception. Furthermore, there is a problem in that a deterioration due to polarization mode dispersion, chromatic dispersion, and/or band limitation tends to be caused because it is not possible to perform equalization by signal processing in the electrical domain that uses phase information, that is, polarization mode dispersion compensation, chromatic dispersion compensation, band compensation, or the like.

The present invention has been made under such backgrounds, and an object thereof is to provide an optical OFDM receiver, an optical transmission system, a subcarrier separation circuit, and a subcarrier separation method with which the advantages shown below can be obtained.

Optical OFDM signals can be separated with a simplified circuit.

Receiver sensitivity is excellent.

Intersymbol interference due to polarization mode dispersion, chromatic dispersion, band limitation, or the like can be compensated for.

Polarizations can be separated from polarization-division multiplexed optical OFDM signals using an equalizer.

Chromatic dispersion can be compensated for by digital signal processing without being subjected to loss and limitation on band or the like.

It is not necessary to transmit signals that increase the speed required for electrical circuits, such as guard intervals and training signals. Therefore, there is no increase in the speed required for electrical circuits, and there is no deterioration in spectral efficiency due to the broadening of the signal band.

Means for Solving the Problems

A subcarrier separation circuit according to a first aspect of the present invention is a subcarrier separation circuit which receives an optical OFDM signal consisting of two subcarriers A and B and separates a subcarrier component, and the subcarrier separation circuit comprises: a first optical reception circuit to which signal light and first local oscillator light are input and which converts the signal light and the first local oscillator into a baseband electrical signal; a first analog/digital conversion circuit which converts the baseband electrical signal into a digital signal; a first frequency shift circuit which shifts the frequency of the converted digital signal so that a center frequency of the subcarrier A becomes zero; and a first computation circuit which adds a frequency shifted signal to a signal obtained by delaying the frequency shifted signal by ½ of a symbol time to separate a component of the subcarrier A.

In the subcarrier separation circuit of the present invention, the first computation circuit may comprise: a delay element which delays the frequency shifted signal by ½ of a symbol time; and an adder which adds the frequency shifted signal to the signal obtained by delaying the frequency shifted signal by ½ of a symbol time to separate the component of the subcarrier A.

In the subcarrier separation circuit of the present invention, in addition to the addition, the first computation circuit may further subtract the signal obtained by delaying the frequency shifted signal by ½ of a symbol time from the frequency shifted signal to separate a component of the subcarrier B.

The subcarrier separation circuit of the present invention may further comprise: a second frequency shift circuit which shift the frequency of the digital signal converted by the first analog/digital conversion circuit so that a center frequency of the subcarrier B becomes zero; and a second computation circuit which adds the frequency shifted signal to the signal obtained by delaying the frequency shifted signal by ½ of a symbol time to separate a component of the subcarrier B.

The subcarrier separation circuit of the present invention may further comprise: a second optical reception circuit to which the received signal light and second local oscillator light are input and which converts the received signal light and the second local oscillator into a baseband electrical signal; a second analog/digital conversion circuit which converts the baseband electrical signal output from the second optical reception circuit into a digital signal; a second frequency shift circuit which shifts the frequency of the digital signal converted by the second analog/digital conversion circuit so that a center frequency of the subcarrier B becomes zero; and a second computation circuit which adds a signal which has been subjected to the frequency shifting by the second frequency shift circuit and a signal obtained by delaying the signal which has been subjected to the frequency shifting by the second frequency shift circuit by ½ of a symbol time to separate a component of the subcarrier B.

An optical OFDM receiver of the present invention comprises: a subcarrier separation circuit of the present invention; and a first demodulator, and the first computation circuit performs an equalization process and a carrier phase recovery process on the separated component of the subcarrier A, and the first demodulator performs demodulation on a signal obtained by the equalization process and the carrier phase recovery process performed by the first computation circuit.

An optical OFDM receiver of the present invention comprises: a subcarrier separation circuit of the present invention; and a first demodulator, and the first computation circuit performs an equalization process and a carrier phase recovery process on the separated component of the subcarrier B, and the first demodulator performs demodulation on a signal obtained by the equalization process and the carrier phase recovery process performed by the first computation circuit.

An optical OFDM receiver of the present invention comprises: a subcarrier separation circuit of the present invention; and a second demodulator, and the second computation circuit performs an equalization process and a carrier phase recovery process on the separated component of the subcarrier B, and the second demodulator performs demodulation on a signal obtained by the equalization process and the carrier phase recovery process performed by the second computation circuit.

In the optical OFDM receivers of the present invention, the first local oscillator light may be set to the optical frequency of the subcarrier A or B, or to an optical frequency in a frequency range so that each computation circuit which performs the equalization process and the carrier phase recovery process is capable of correcting the optical frequency in the frequency range to the optical frequency of the subcarrier A or B.

An optical OFDM receiver of the present invention comprises: a subcarrier separation circuit of the present invention; and a second demodulator, and the second computation circuit performs an equalization process and a carrier phase recovery process on the separated component of the subcarrier B, and the second demodulator performs demodulation on a signal obtained by the equalization process and the carrier phase recovery process performed by the second computation circuit.

In the optical OFDM receivers of the present invention, the first computation circuit may perform an equalization process and a carrier phase recovery process on the separated component of the subcarrier A, and the first optical reception circuit may set the first local oscillator light to a center optical frequency of the subcarrier A, or to an optical frequency in a frequency range so that the first computation circuit which performs the equalization process and the carrier phase recovery process is capable of correcting the optical frequency in the frequency range to the center optical frequency of the subcarrier A, and the second optical reception circuit may set the second local oscillator light to a center optical frequency of the subcarrier B, or to an optical frequency in a frequency range so that the second computation circuit which performs the equalization process and the carrier phase recovery process is capable of correcting the optical frequency in the frequency range to the center optical frequency of the subcarrier B.

In the optical OFDM receivers of the present invention, the first local oscillator light may be set to a center optical frequency between the subcarrier A and the subcarrier B, or to an optical frequency in a frequency range so that each computation circuit which performs the equalization process and the carrier phase recovery process is capable of correcting the optical frequency in the frequency range to the center optical frequency between the subcarrier A and the subcarrier B.

In the optical OFDM receivers of the present invention, the first computation circuit may be a digital signal processing circuit which comprises: an equalizer configured by a transversal filter; and a setting unit which performs setting to a first mode in which coefficients of the transversal filter are set so that an input signal to the first computation circuit is added to a signal obtained by delaying the input signal by ½ of a symbol time.

In the optical OFDM receivers of the present invention, the setting unit may select any one of the first mode and a second mode in which setting is performed so as to subtract, from the input signal to the first computation circuit, the signal obtained by delaying the input signal by ½ of a symbol time, and the first demodulator may obtain a signal of the subcarrier A when the first mode is set, and may obtain a signal of the subcarrier B when the second mode is set.

A subcarrier separation circuit of the present invention is a subcarrier separation circuit which receives an optical OFDM signal consisting of N subcarriers, N being an integer greater than or equal to 2, and separates a subcarrier component, and the subcarrier separation circuit comprises: at least one system of optical reception circuits, received signal light and at least one system of local oscillator light being input to each optical reception circuit, each optical reception circuit converting the received signal light and the local oscillator light into a baseband electrical signal; at least one system of analog/digital conversion circuits, each analog/digital conversion circuit converting the baseband electrical signal into a digital signal; N systems of frequency shift circuits which shift the frequency of the converted digital signal so that a center frequency of a desired subcarrier becomes zero; N systems of band limiting filters which limit bands of signals which have been subjected to the frequency shifting by the N systems of the frequency shift circuits, respectively, so that signals in the same pass band as a signal bandwidth of the desired subcarrier are passed therethrough; and N systems of adders which add signals whose bands have been limited by the N systems of the band limiting filters to signals obtained by delaying the signals whose bands have been limited by ½ of a symbol time, to separate components of the N subcarriers.

In the subcarrier separation circuits of the present invention, the at least one system of the local oscillator light may be N systems of local oscillator light, the at least one system of the optical reception circuits may be N systems of optical reception circuits to which the received signal light and the N systems of the local oscillator light are respectively input and which respectively convert the received signal light and the local oscillator light into baseband electrical signals, the at least one system of the analog/digital conversion circuits may be N systems of analog/digital conversion circuits which respectively convert the baseband electrical signals respectively output from the N systems of the optical reception circuits into digital signals, and the N systems of the frequency shift circuits may shift the frequencies of the digital signals respectively converted by the N systems of the analog/digital conversion circuits so that the center frequency of the desired subcarrier becomes zero.

An optical OFDM receiver of the present invention comprises: a subcarrier separation circuit of the present invention; N systems of digital signal processing circuits which respectively perform an equalization process and a carrier phase recovery process on components of the N subcarriers; and N systems of demodulators which perform demodulation on signals obtained by the equalization process and the carrier phase recovery process performed by the N systems of digital signal processing circuits, respectively.

In the optical OFDM receivers of the present invention, the N systems of the local oscillator light may be set to center frequencies of desired subcarriers for the respective N systems of the optical reception circuits, or to optical frequencies in frequency ranges so that the respective N systems of the digital signal processing circuits which perform the equalization process and the carrier phase recovery process are respectively capable of correcting the optical frequencies in the frequency ranges to the center optical frequencies of the desired subcarriers.

A subcarrier separation circuit of the present invention is a subcarrier separation circuit which receives an optical OFDM signal consisting of N subcarriers and separates a subcarrier component, and the subcarrier separation circuit comprises: an optical reception circuit to which received signal light and local oscillator light are input and which converts the received signal light and the local oscillator light into a baseband electrical signal; an analog/digital conversion circuit which converts the baseband electrical signal into a digital signal; a frequency shift circuit which shifts the frequency of the converted digital signal so that a center frequency of the lowest subcarrier or the highest subcarrier becomes zero; and a computation circuit which multiplies N signals Ek obtained by delaying a symbol phase of an electrical signal output from the frequency shift circuit by times determined by (k/N)T, k being integers from 0 to N−1, T being one symbol time, by N coefficients included in each of N systems of coefficients related to phase, respectively, to obtain N systems of multiplied signals in which a k-th multiplied signal among N multiplied signals included in the l-th system, l being an integer in the range of 0 to N−1, determined by

[Equation 1]

$$e^{-j\frac{2\pi}{N}k\cdot\ell} \cdot E_k,$$

j being an imaginary unit, obtains N systems of added signals obtained by adding N multiplied signals included in each system, and separates components of the N subcarriers.

In the subcarrier separation circuits of the present invention, the computation circuit may comprise: a dividing unit which divides the electrical signal output from the frequency shift circuit into N; delaying units which are connected to an output of the dividing unit, and delay a symbol phase of divided signals by the times determined by (k/N)T, respectively, to output the N signals Ek; N adding units which add the N signals Ek delayed by the delaying units; and multiplying units provided between the delaying units and the adding units which multiply a k-th input signal Ek among signals input to an l-th adding unit by a k-th coefficient included in an l-th system among the coefficients related to phase.

An optical OFDM receiver of the present invention comprises: a subcarrier separation circuit of the present invention; and N demodulators, and the computation circuit performs an equalization process and a carrier phase recovery process on respective separated components of the N subcarriers; and the N demodulators demodulate N subcarrier signals from an output signal of the computation circuit, respectively.

In the optical OFDM receivers of the present invention, the computation circuit may be a digital signal processing circuit which performs the equalization process and the carrier phase recovery process on the electrical signal output from the frequency shift circuit, the digital signal processing circuit may include an N-th order transversal filter-type adaptive equalizer which is provided with N delay taps of (1/N)T, and the transversal filter-type adaptive equalizer may comprise a multiplying unit which multiplies a k-th input signal Ek which is input to an l-th output terminal by a tap coefficient to output a multiplied signal determined by

[Equation 2]

$$e^{-j\frac{2\pi}{N}k\cdot\ell} \cdot E_k,$$

and may perform digital signal processing for the multiplication of the tap coefficient.

In the optical OFDM receivers of the present invention, the optical reception circuit may be an optical quadrature reception circuit.

In the optical OFDM receivers of the present invention, the signal light may be a polarization-division multiplexed signal, each optical reception circuit may be a polarization diversity-type optical reception circuit, each analog/digital conversion circuit may be configured by two sets of analog/digital conversion circuits for a X-polarization signal and a Y-polarization signal, and each demodulator may perform demodulation for the X-polarization signal and the Y-polarization signal.

The optical OFDM receivers of the present invention may further comprise a chromatic dispersion compensation circuit which compensates for chromatic dispersion of a transmission line by digital signal processing on a digital signal converted by each analog/digital conversion circuit.

In the optical OFDM receivers of the present invention, the chromatic dispersion compensation circuit may be configured by a transversal filter.

In the optical OFDM receivers of the present invention, the chromatic dispersion compensation circuit may comprise: a discrete Fourier transform unit which performs a discrete Fourier transform to convert a signal in the time domain into a signal in the frequency domain; an equalization unit which applies phase rotation that is opposite to phase rotation due to chromatic dispersion to each frequency component signal obtained by the Fourier transform; and an inverse discrete Fourier transform unit which performs an inverse discrete Fourier transform on a signal in the frequency domain output from the equalization unit to convert the signal in the frequency domain into a signal in the time domain and output the signal in the time domain.

The optical OFDM receivers of the present invention may further comprise a dispersion measuring unit which measures a chromatic dispersion amount of a transmission fiber from a difference between propagation delay times of subcarriers and sets the dispersion compensation amount of the chromatic dispersion compensation circuit.

The optical OFDM receivers of the present invention may further comprise a differential decoder which performs differential decoding on an output signal from each demodulator corresponding to each subcarrier.

Moreover, the present invention can be viewed from the viewpoint of an optical transmission system which is provided with an optical OFDM receiver of the present invention.

A subcarrier separation method of the present invention is a subcarrier separating method which receives an optical OFDM signal consisting of two subcarriers A and B and separates a subcarrier component, and the method comprises: receiving received signal light and local oscillator light and converting the received signal light and the local oscillator light into a baseband electrical signal; converting the baseband electrical signal into a digital signal; shifting the frequency of the converted digital signal so that a center frequency of the subcarrier A becomes zero; and adding a frequency shifted signal to a signal obtained by delaying the frequency shifted signal by ½ of a symbol time to separate a component of the subcarrier A.

Effects of the Invention

In accordance with the present invention, it is possible to separate optical OFDM signals using a simplified circuit such as a delay element, an adder, and/or a subtractor. Moreover, in accordance with the present invention, since coherent reception is used, receiver sensitivity is excellent compared to direct reception of light. Moreover, in accordance with the present invention, equalization is performed by digital signal processing, intersymbol interferences due to polarization mode dispersion, chromatic dispersion, band limitation, or the like can be compensated for. Moreover, in accordance with the present invention, it is possible to separate polarizations from a polarization-division multiplexed optical OFDM signal by an equalizer. Moreover, since the present invention need not transmit signals other than data of information, such as guard intervals and training signals, there is no increase in speed required for electrical circuits, and there is no deterioration in spectral efficiency due to the broadening of the signal band. Moreover, in accordance with the present invention, since chromatic dispersion can be compensated for by the digital signal processing without being subjected to loss and limitation on band or the like, the dispersion compensation amount can be greatly improved.

BRIEF DESCRIPTION OF THE DRAWINGS

FIG. 3 is an explanatory diagram of a method for setting the frequency of LO light in the first embodiment.

EXPLANATION OF REFERENCE SYMBOLS

| | |
|---|---|
| 1, 1A, 1B, 1-1, 1-2, . . . , and 1-N | LO light |
| 2, 2A, 2B, 2-1, 2-2, . . . , and 2-N | optical quadrature reception circuits |
| 3, 3A, 3B, 3-1, 3-2, . . . , and 3-N | analog/digital conversion circuits |
| 4, 4A, 4B, 4-1, 4-2, . . . , and 4-N | frequency shift circuits |
| 5, 5A, 5B, 5-1, 5-2, . . . , and 5-N | delay elements |
| 6, 6A, 6B, 6-1, 6-2, . . . , and 6-N | adders |
| 7 | subtractor |
| 8, 8A, 8B, 8-1, 8-2, . . . , and 8-N | digital signal processing circuits |
| 9, 9A, 9B, 9-1, 9-2, . . . , and 9-N | demodulators |
| 10 | digital signal processing circuit (an equalizer in which coefficients of a transversal filter are set so as to match an OFDM subcarrier separation computation) |
| 11-1, 11-2, . . . , and 11-N | band limiting filters |
| 21 | optical 90-degree hybrid coupler |
| 22 | balanced receiver |
| 23 | resampling circuit |
| 24 | adaptive equalizer using CMA algorithm |
| 25 | carrier phase recovery circuit |
| 26 | adaptive equalizer using LMS algorithm |
| 27, 27A, 27B, and 27C | chromatic dispersion compensation circuits |
| 30 and 40 | serial/parallel conversion units |
| 31 and 41 | discrete Fourier transform units |
| 32 and 42 | equalization units |
| 33 and 43 | inverse discrete Fourier transform units |
| 34 and 46 | parallel/serial conversion units |
| 35 and 45 | data retention units |
| 44 | addition circuit |
| 50 | dispersion measurement circuit |
| 60 | differential decoding unit |

BEST MODE FOR CARRYING OUT THE INVENTION

Hereinbelow, embodiments of the present will be described using the drawings.

First Embodiment

Figure 1:
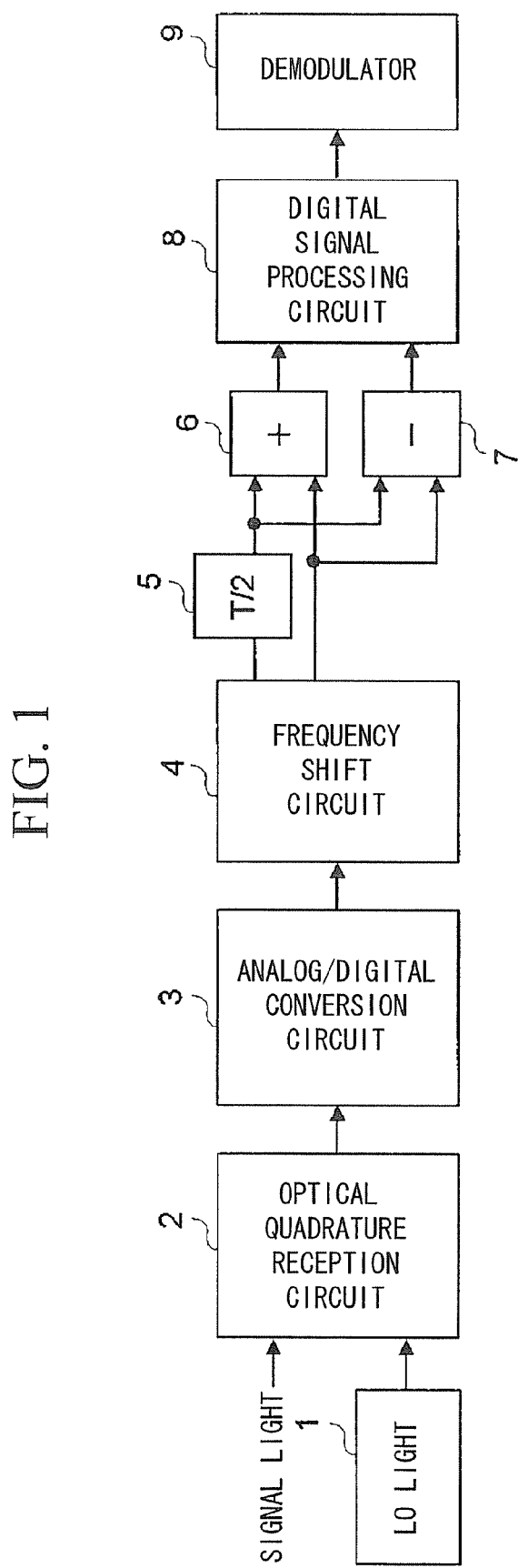
FIG. 1 is a block diagram showing the structure of an optical OFDM receiver in accordance with a first embodiment.

The structure of an optical OFDM receiver in accordance with a first embodiment of the present invention will be explained with reference to FIG. 1. FIG. 1 is a block diagram showing the structure of the optical OFDM receiver in accordance with the first embodiment of the present invention. It is assumed that signal light is a two-subcarrier optical OFDM signal and each subcarrier is modulated with, for example, QPSK (quadrature phase-shift keying). It is noted hereinbelow that local oscillator light is abbreviated as "LO light". LO light 1 is continuous light. The modulation format for each subcarrier can be any modulation scheme including not only QPSK but also BPSK (binary phase-shift keying), intensity modulation, quadrature amplitude modulation, M-ary phase-shift keying, or the like.

One unit of code for sending information is termed as one symbol, and it is assumed that a signal of each subcarrier is modulated with, for example, 11.1 G symbol/s (=11.1 G baud/s). Since one symbol can have a four-level (the second power of 2) value in the case of QPSK, the transfer rate of information is 22.2 G bit/s.

Among OFDM signals, a combined signal consisting of a plurality of subcarriers is termed as an OFDM block or an OFDM frame, and it is desirable that all the start times and all the end times of symbols of all the subcarriers be equal to one another at the transmitting side, which is referred to as "no skew". In addition, in optical transmission systems and optical transmission methods which use optical OFDM receivers of the present invention, there are no guard intervals and no training symbols, the length of an OFDM block is equal to the length of a symbol of each subcarrier, and one OFDM block is identical to one symbol. Accordingly, the present invention will be explained without distinguishing one OFDM block from one symbol.

Signal light and LO light 1 are input into an optical quadrature reception circuit 2 configured by an optical 90-degree hybrid coupler and optical detectors. In the optical quadrature reception circuit 2, the signal light is separated into an I-phase component and a Q-phase component at the output of the optical 90-degree hybrid coupler, and the I-phase component and the Q-phase component are respectively converted into electrical signals by the optical detectors. Although it is conceivable that the optical detectors are balanced receivers or normal optical detectors other than balanced receivers, balanced receivers are desirable from the viewpoint of receiver sensitivity and elimination of DC offsets.

Since the I-phase component and the Q-phase component of the signal light are not generated if the polarization direction of the signal light does not coincide with that of the LO light 1, the optical 90-degree hybrid coupler normally employs a polarization diversity structure. That is, the components of the signal light are separated into an X-polarization and a Y-polarization by a polarization beam splitter, and the LO light 1 is divided into two at a ratio of 1:1, which are input into two optical 90-degree hybrid couplers.

That is, upon input of an X-polarization component of the signal light and a component obtained by matching a half of the LO light with the X-polarization into an optical 90-degree hybrid coupler for the X-polarization, an I-phase component and a Q-phase component of the X-polarization component of the signal light are separated at the output of the optical 90-degree hybrid coupler, and the I-phase component and the Q-phase component of the X-polarization component are converted into electrical signals by optical detectors. In addition, upon input of a Y-polarization component of the signal light and a component obtained by matching a half of the LO light with the Y-polarization into an optical 90-degree hybrid coupler for the Y-polarization, an I-phase component and a Q-phase component of the Y-polarized component of the signal light are separated at the output of the optical 90-degree hybrid coupler, and the I-phase component and the Q-phase component of the Y-polarization component are converted into electrical signals by optical detectors.

Alternatively, instead of employing the polarization diversity structure, the polarization direction of the LO light may be controlled so as to match a polarization of the signal light. To this end, the polarization direction of the LO light is controlled using a polarization controller or the like so that the I-phase component and the Q-phase component of the signal light which are generated from the output of an optical 90-degree hybrid coupler become maximum. Alternatively, a polarization detector which detects the polarization direction of the signal light may be installed in the optical quadrature reception circuit, and the polarization direction of the LO light may be controlled using a polarization controller or the like so that the polarization direction of the LO light matches the polarization of the signal light.

An analog/digital conversion circuit 3 discretizes (samples) an analog electrical signal consisting of the I-phase component and the Q-phase component of the signal light in the time domain, and converts them into a numerically quantized digital signal. Since there are two components including an I-phase component and a Q-phase component of the signal light, two analog/digital conversion circuits are used. Moreover, when a polarization diversity structure is used, there are four components including an I-phase component and a Q-phase component of an X-polarization component and an I-phase component and a Q-phase component of a Y-polarization component, and thus four analog/digital conversion circuits are used. As the analog/digital conversion circuits, those having a precision of 4 bits to 16 bits or so are used. Analog/digital conversion circuits having a precision of 8 bits were used in verification by our experiments.

The sampling rate is related to the operations of equalizers that configure a digital signal processing circuit 8, which will be described later. If sampling is performed at the same rate as a symbol rate, equalization is performed using an equalizer which operates at the symbol rate (a symbol-rate equalizer), and the sampling time is optimized to be, for example, the center of a symbol, all the pieces of information on a signal can be obtained and the signal can be equalized, but if the sampling time cannot be optimized to be the center of a symbol, the equalization performance is deteriorated. In the case in which the sampling time cannot be optimized to be the center of a symbol, there is no need to take the phase of the sampling timing into consideration by performing fractionally-spaced sampling and equalization using a fractionally-spaced equalizer. Therefore, it is desirable that oversampling be performed at a rate twice or greater the symbol rate and equalization be performed using a fractionally-spaced equalizer.

Additionally, as will be explained later, since a ½-symbol delay is applied to separate a two-subcarrier OFDM signal, oversampling is performed at a multiple of two. Furthermore, in this case, if subcarriers are separated, components that are valid as subcarrier signals are included only in a half of one symbol time, and thus it is desirable that oversampling be performed at a rate four times or greater the symbol rate and equalization be performed using a fractionally-spaced equalizer in order to perform fractionally-spaced sampling using this portion and to perform equalization using a fractionally-spaced equalizer.

In the verification by our experiments, sampling was performed at a rate four times the symbol rate. That is, since one symbol was sampled at four points, there were 4 sample/symbol. Since the symbol rate is 11.1 G symbol/s in the verification by our experiments, the sampling rate is 44.4 G sample/s. In order to obtain this sampling, sampling may actually be performed at a 44.4 G sample/s, or signals which have been sampled at another sampling rate may be resampled using numerical interpolation or the like. Also in the verification by our experiments, signals that had been sampled at a 50 G sample/s were resampled at a 44.4 G sample/s.

If I and Q signals of digital signals are treated collectively, they can be treated collectively as a complex number. If I and Q signals are treated individually, they are treated as individual real numbers, and thus a circuit for an I signal and a circuit for a Q signal are required. In the explanation of the present invention, I and Q signals are treated as individual real numbers by analog circuits, and they are treated collectively as a complex number after they are converted into digital signals.

Subsequently, a frequency shift circuit (an automatic frequency control circuit) 4 is used to shift the frequency of a digital electrical signal which has been converted from an optical OFDM signal consisting of two subcarrier signals A and B so that the center frequency of one of the subcarriers, for example, a subcarrier A, becomes zero. The function of the frequency shift circuit 4 is to shift the frequency of the signal using the frequency shift circuit 4 so that a frequency shift and a phase shift in a subcarrier frequency detected by the digital signal processing circuit 8, which will be described later, become zero. Since an input signal of the frequency shift circuit 4 is a digital signal, the digital signal is multiplied by $\exp(j2\pi ft)$ in order to shift the frequency of the signal by f (where j denotes an imaginary unit and t denotes time).

Subsequently, an adder 6 computes the sum of a signal obtained by delaying an output signal of the frequency shift circuit 4 by a ½ symbol (which is equal to a ½OFDM block) using a delay element 5 and a signal without delay. As a result of the computation of the sum, a subcarrier A component is extracted from the two subcarriers and the other subcarrier B component is removed. Additionally, a subtractor 7 computes the difference between the signal obtained by delaying the output signal of the frequency shift circuit 4 by a ½ symbol (which is equal to a ½ OFDM block) and the signal without delay (that is, a signal obtained by delaying a frequency shifted signal by ½ of a symbol time is subtracted from this frequency shifted signal), thereby removing the subcarrier A component and extracting the subcarrier B component. These operations are referred to as an OFDM subcarrier separation computation. These operations will be explained later using FIG. 4A to FIG. 4D.

As an exemplary structure of the digital signal processing circuit 8, there is a structure which consists of an adaptive equalizer and a carrier phase recovery circuit and which equalizes signals of extracted subcarrier components and estimates a signal modulated by a transmitter.

As an equalizer (a first equalizer), a linear equalizer configured by a transversal filter can be used. A nonlinear equalizer that is provided with decision feedback can also be used.

The CMA (Constant Modulus Algorithm) is used as an algorithm which determines the coefficients of the transversal filter of the equalizer. Since the CMA does not use phase information of subcarriers and it can determine the coefficients of the equalizer using only information indicating that amplitude is constant, blind equalization which uses no training signals can be performed.

Furthermore, in place of a training signal, a signal which is obtained by performing equalization with the CMA, carrier phase recovery, and demodulation may be further equalized by a second equalizer which uses the LMS (Least Mean Square) or the RLS (Recursive Least Square) algorithm, thereby making it possible to increase equalization performance.

Additionally, in place of a training signal, a signal demodulated based on an equalized output of the first equalizer that uses the CMA may be equalized by the second equalizer using the LMS or the RLS algorithm, and after the tap coefficients of the second equalizer have been stabilized, in place of the signal demodulated based on the equalized output of the first equalizer that uses the CMA as well as in place of a training signal, a signal demodulated based on the output of the second equalizer may be sent back to the second equalizer and it may be equalized. As a result, equalization can be performed without operating the first equalizer by the CMA. Moreover, since the first equalizer by the CMA that provides poor equalization performance is not used, equalization performance can be increased.

The equalizers compensate for various intersymbol interferences, for example, polarization mode dispersion, chromatic dispersion, band limitation, or the like. As a result, polarization mode dispersion tolerance, chromatic dispersion tolerance, and band limitation tolerance can be increased. This means that polarization mode dispersion tolerance and chromatic dispersion tolerance can be improved without using a guard interval which is configured by a cyclic prefix or the like and which is used in non-patent document 1 or the like.

Carrier phase recovery is performed after the equalization by the equalizer. In the case of QPSK, a fourth-power law is used to correct the phase of a carrier and to determine the absolute phase of each subcarrier signal. In general, in the case of N-level phase modulation, the N-th power of a signal input to an equalizer is calculated to correct the phase of a carrier and to determine the absolute phase of each subcarrier signal. Moreover, information on a phase shift is used to control the frequency shift circuit 4. Since the rate of a change in phase is frequency, a frequency shift can be detected. Finally, a demodulator 9 demodulates a signal and performs symbol decision.

Figure 2:
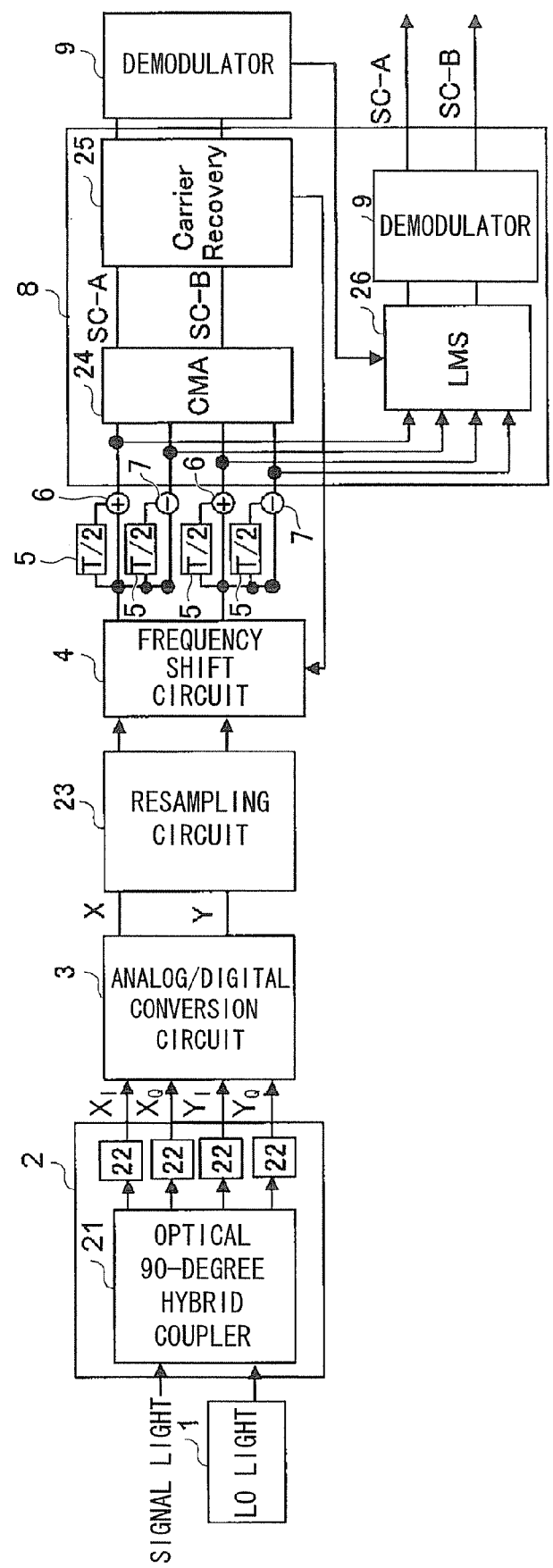
FIG. 2 is a diagram showing a specific example of the structure of the optical OFDM receiver in accordance with the first embodiment.

FIG. 2 shows the structure that includes these specific examples. Reference symbol 21 denotes an optical 90-degree hybrid coupler; reference symbol 22 denotes a balanced receiver; reference symbol 23 denotes a resampling circuit which resamples a signal which has been sampled at a sampling rate which is different from an integral multiple of the symbol rate, using numerical interpolation at an integral multiple of the symbol rate; reference symbol 24 denotes an adaptive equalizer which uses the CMA algorithm; reference symbol 25 denotes a carrier phase recovery circuit; and reference symbol 26 denotes an adaptive equalizer which uses the LMS algorithm. The carrier phase recovery circuit 25 detects a frequency error and a phase error, and controls the frequency shift circuit 4. Additionally, the adaptive equalizer 26 performs adaptive equalization in accordance with the LMS algorithm using the output of the demodulator 9 at the CMA side as a reference signal.

FIG. 3 is an explanatory diagram of a method for setting the frequency of the LO light in the first embodiment. The frequency of the LO light 1 is set so as to match the center frequency of a subcarrier to be received which is included in the OFDM signal of the signal light, for example, the subcarrier A (in the figure, abbreviated as SC-A), or it is set to a value in the vicinity thereof. Here, "vicinity" refers to an optical frequency in a frequency range that an equalizer and a carrier phase recovery circuit are capable of correcting the frequency of the LO light 1 to the center frequency of, for example, the subcarrier A. It is noted that this frequency range is determined in accordance with, for example, a laser to be used and/or the symbol rate of a signal to be handled.

One of the setting methods is as follows. Since the frequency of the signal light is determined by a frequency termed as an ITU-T grid, the wavelength of the signal light can be obtained by measurement using an optical filter, a wavelength meter, an optical spectrum analyzer, or the like. The frequency of the LO light is controlled so as to match the center frequency of a subcarrier to be received which is included in the OFDM signal of the signal light or so as to be located in the vicinity thereof by using an optical filter, a wavelength meter, an optical spectrum analyzer, or the like.

By setting the LO light in this manner, the center frequency of the subcarrier A is located in the vicinity of zero in an electrical spectrum converted into baseband which appears at the output of the optical quadrature reception circuit. Accordingly, the center frequency of the subcarrier A can be controlled so as to be zero by just slightly operating the frequency shift circuit 4. Furthermore, such a setting makes it possible to reduce the frequency band of baseband electrical circuits which is required for demodulating the subcarrier A.

FIG. 4A to FIG. 4D are diagrams explaining the separation of a two-subcarrier OFDM signal in the first embodiment. It is assumed that the frequency is shifted so that the center frequency of the component of the subcarrier A among the two subcarriers A and B becomes zero. At this time, the center frequency of the subcarrier B components is shifted by a subcarrier spacing. By adding a signal obtained by delaying the output of the frequency shift circuit 4 by a ½ symbol (which is equal to a ½ OFDM block) (see FIG. 4B) to a signal without delay (see FIG. 4A) at a ratio of 1:1 (see FIG. 4C), the subcarrier B components are cancelled and only the subcarrier A components appear in the portions where the same symbols overlap with each other.

Figure 4A:
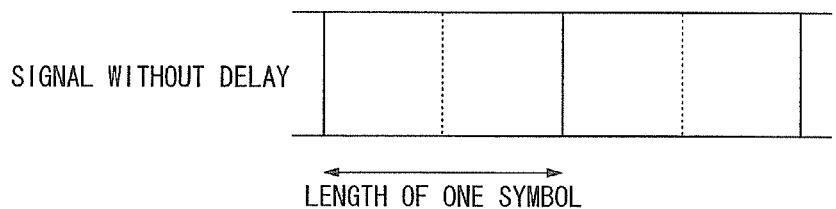
FIG. 4A is an explanatory diagram of the separation of a two-subcarrier OFDM signal in the first embodiment, and it is a diagram showing a signal output from a frequency shift circuit.
Figure 4B:
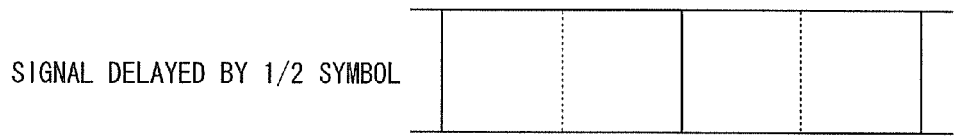
FIG. 4B is an explanatory diagram of the separation of the two-subcarrier OFDM signal in the first embodiment, and it is a diagram showing a signal obtained by delaying the output signal of the frequency shift circuit by a ½ symbol.
Figure 4C:
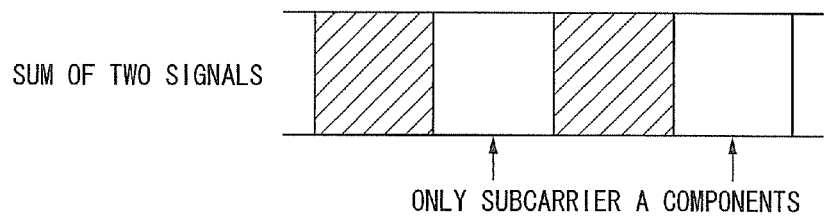
FIG. 4C is an explanatory diagram of the separation of the two-subcarrier OFDM signal in the first embodiment, and it is a diagram showing the sum of the two signals shown in FIG. 4A and FIG. 4B.
Figure 4D:
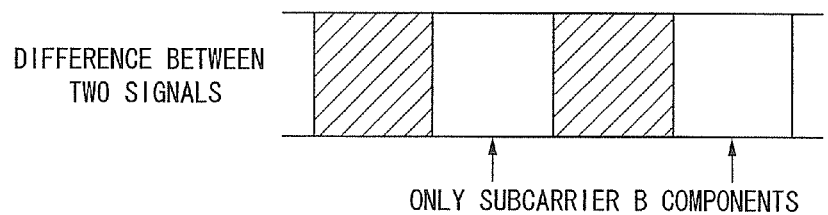
FIG. 4D is an explanatory diagram of the separation of the two-subcarrier OFDM signal in the first embodiment, and it is a diagram showing the difference between the two signals shown in FIG. 4A and FIG. 4B.

In contrast, the subcarrier A components and the subcarrier B components are mixed in the portions indicated by oblique lines in FIG. 4C. Therefore, the subcarrier A components can be extracted as an output signal of the equalizer by determining the coefficients of a transversal filter-type equalizer included in the digital signal processing circuit 8 so as to be small in the portions of the oblique lines and by determining the coefficients so as to be large in the portions where only the subcarrier A components appear.

Moreover, as a result of the subtraction between the signal obtained by delaying the output of the frequency shift circuit 4 by a ½ symbol (which is equal to a ½ OFDM block) and the signal without delay at a ratio of 1:1 (see FIG. 4D), the subcarrier A components are cancelled and only the subcarrier B components appear in the portions where the same symbols overlap with each other. The subcarrier A components and the subcarrier B components are mixed in the portions indicated by oblique lines in FIG. 4D. Therefore, by determining the coefficients of the transversal filter-type equalizer included in the digital signal processing circuit 8 so as to be small in the portions of the oblique lines and by determining the coefficients so as to be large in the portions where only the subcarrier B components appear, the subcarrier B components can be extracted as an output signal of the equalizer.

Although optical OFDM, which uses a technique similar to that of conventional radio, forms OFDM frames (also termed as OFDM blocks) in which a guard interval is configured by a cyclic prefix, the present invention requires no guard intervals. Although conventional OFDM separates respective subcarriers by applying FFT to an OFDM frame having a guard interval, the present invention does not use FFT for subcarrier separation.

Additionally, since the present invention uses no guard intervals and uses blind equalization that uses no training signals, the method for configuring symbols and the structure of a transmitter are the same as those of the method for separating subcarriers in the optical domain using a Mach-Zehnder delay interferometer and performing direct reception (square-law detection), and thus the present invention is characterized in that the same transmitter as that employed in a direct reception scheme can be used.

As a generator (a transmitter or a generation method) of optical OFDM signals, a method for generating a plurality of subcarriers and modulating the respective subcarriers with QPSK or the like can be used as employed by the transmitter disclosed in non-patent document 1.

Alternatively, optical OFDM signals can be generated by converting a binary data signal into a plurality of parallel signals (serial to parallel conversion), modulating the respective parallel signals (each of which corresponding to respective subcarriers) with QPSK or the like, generating a modulated signal by performing collective IFFT (inverse Fourier Transform), applying a D/A conversion thereto, and driving an optical modulator using an analog modulation signal. That is, optical OFDM signals can be generated in accordance with a method similar to that employed by the transmitter disclosed in non-patent document 2, even with a structure that uses no guard intervals and no training symbols.

Second Embodiment of the Present Invention

Figure 5:
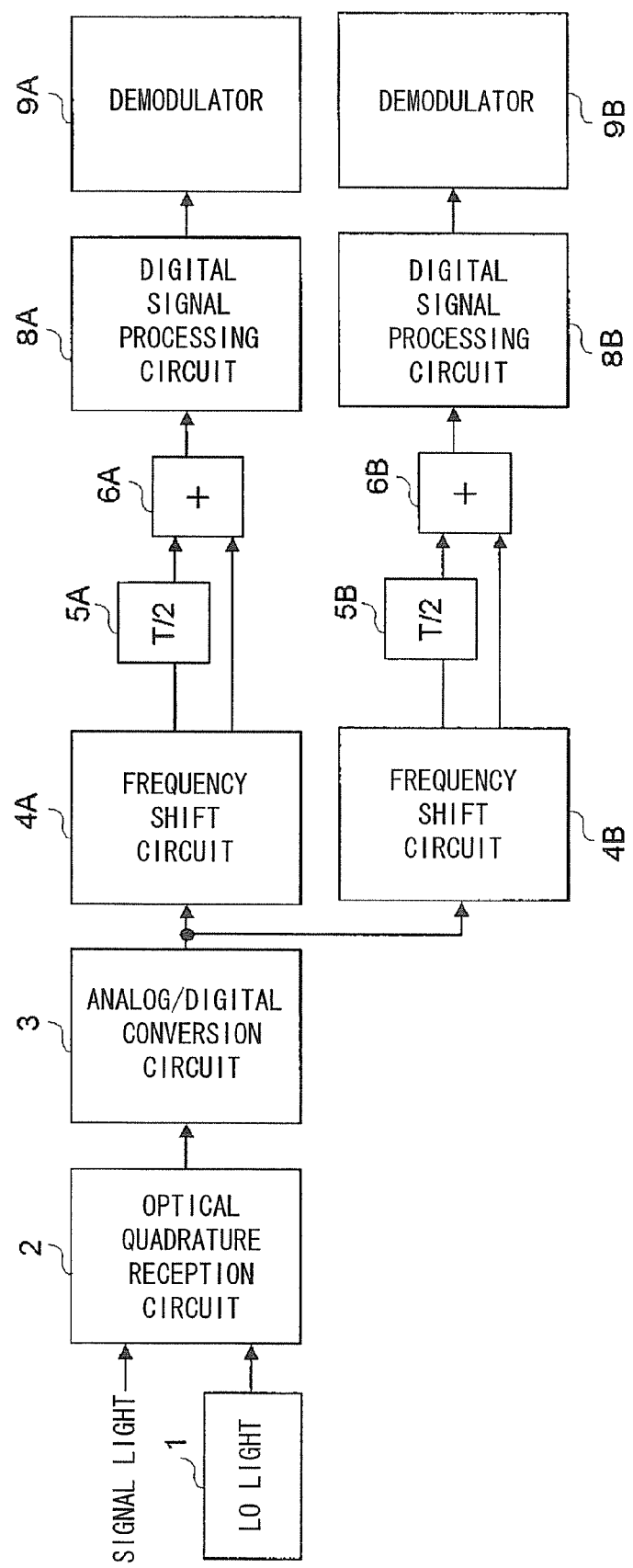
FIG. 5 is a block diagram showing the structure of an optical OFDM receiver in accordance with a second embodiment.

The structure of an optical OFDM receiver in accordance with a second embodiment of the present invention will be explained with reference to FIG. 5. FIG. 5 is a block diagram showing the structure of the optical OFDM receiver in accordance with the second embodiment of the present invention. The portions up to and including the analog/digital conversion circuit 3 are the same as those of the first embodiment of the present invention.

A digital signal output from the analog/digital conversion circuit 3 is divided into two, and the structures each including the frequency shift circuit 4 and its subsequent circuits are provided for two systems for a subcarrier A and a subcarrier B. A frequency shift circuit 4A shifts the frequency of a converted digital electrical signal, which is an OFDM signal consisting of the two subcarriers A and B, so that the center frequency of one of the subcarriers, or the subcarrier A, becomes zero. A digital signal processing circuit 8A detects a frequency shift and a phase shift in the frequency of the subcarrier, and controls the frequency shift circuit 4A so that the shifts become zero.

Subsequently, an adder 6A computes the sum of a signal obtained by delaying the output of the frequency shift circuit 4A by a ½ symbol (which is equal to a ½ OFDM block) using a delay element 5A and a signal without delay at a ratio of 1:1. Among the two subcarriers, the subcarrier A component is extracted and the subcarrier B component is removed. After the digital signal processing circuit 8A has performed equalization and carrier phase recovery, a demodulator 9A performs demodulation.

A frequency shift circuit 4B shifts the frequency of the converted digital electrical signal, which is the OFDM signal consisting of the two subcarriers A and B, so that the center frequency of one of subcarriers, or the subcarrier B, becomes zero. A digital signal processing circuit 8B detects a frequency shift and a phase shift in the frequency of the subcarrier, and controls the frequency shift circuit 4B so that the shifts become zero. Demodulation is then performed in the same manner as that for the subcarrier A.

Third Embodiment of the Present Invention

Figure 6:
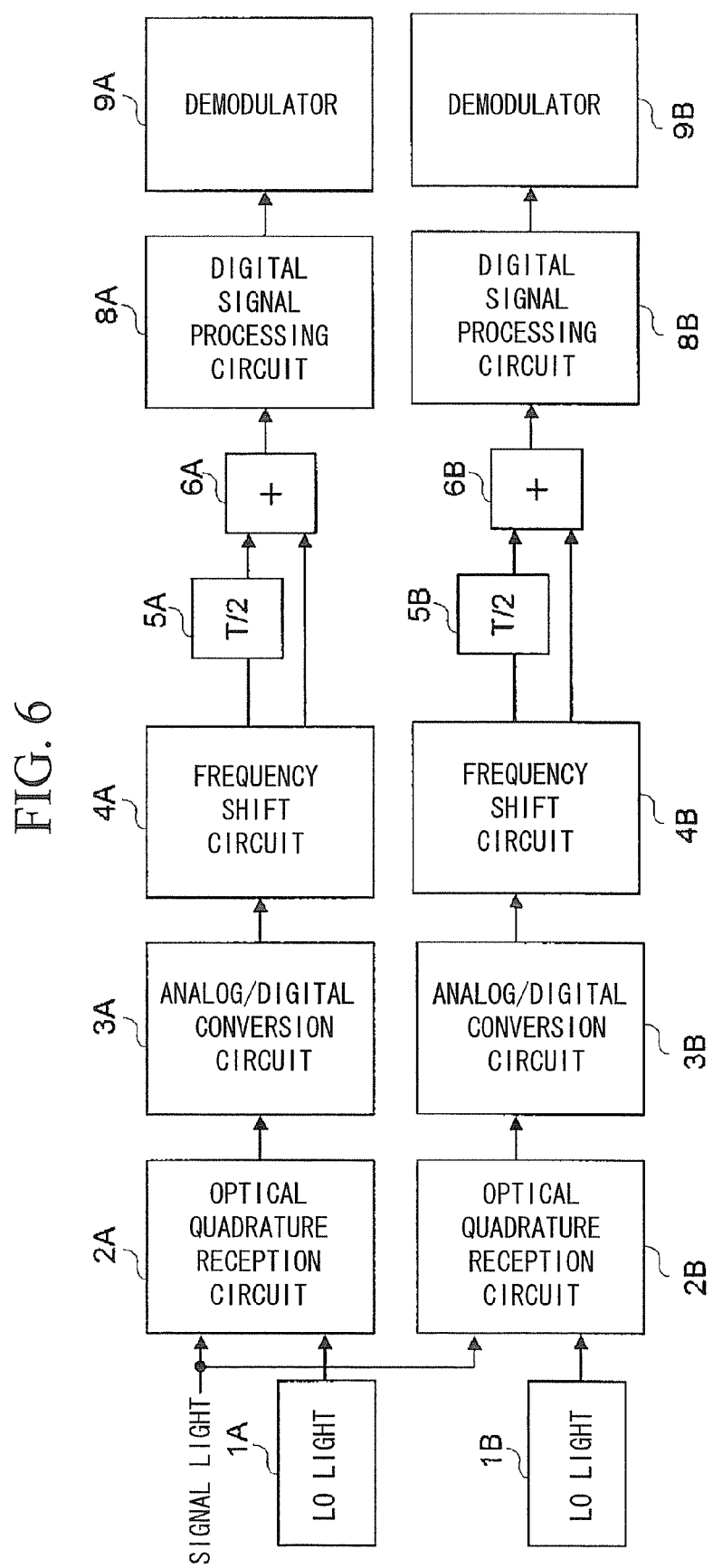
FIG. 6 is a block diagram showing the structure of an optical OFDM receiver in accordance with a third embodiment.

The structure of an optical OFDM receiver in accordance with a third embodiment of the present invention will be explained with reference to FIG. 6. FIG. 6 is a block diagram showing the structure of the optical OFDM receiver in accordance with the third embodiment of the present invention. Optical OFDM receivers are provided for two systems (a system A and a system B), and signal light is divided into two, which are respectively input into the optical OFDM receivers. The optical frequency of LO light 1A is set so as to match the center frequency of one of subcarriers, a subcarrier A, of an optical OFDM signal consisting of two subcarriers A and B, or it is set to a frequency in the vicinity thereof.

The signal light and the LO light 1A are input into an optical quadrature reception circuit 2A, which is configured by an optical 90-degree hybrid coupler and optical detectors. The signal light are separated into an I-phase component and a Q-phase component at the output of the optical 90-degree hybrid coupler, which are converted into electrical signals by the optical detectors, and an analog electrical signal consisting of the I-phase component and the Q-phase component of the signal light is discretized and quantized by an analog/digital conversion circuit 3A, thereby being converted into a digital signal.

A frequency shift circuit 4A shifts the frequency so that the center frequency of one of the subcarriers of the OFDM signal, or the subcarrier A, becomes zero. A digital signal processing circuit 8A detects a frequency shift and a phase shift in the frequency of the subcarrier, and controls the frequency shift circuit 4A so that the shifts become zero.

Subsequently, an adder 6A computes the sum of a signal obtained by delaying the output of the frequency shift circuit 4A by a ½ symbol (which is equal to a ½ OFDM block) using a delay element 5A and a signal without delay at a ratio of 1:1. Among the two subcarriers, the subcarrier A component is extracted and the subcarrier B component is removed. Moreover, after the digital signal processing circuit 8A has performed equalization and carrier phase recovery, a demodulator 9A demodulates the subcarrier A component.

In order to extract the subcarrier B, the optical frequency of LO light 1B is set so as to match the center frequency of one of the subcarriers, or the subcarrier B, of the optical OFDM signal consisting of the two subcarriers A and B, or it is set to a frequency in the vicinity thereof. An optical quadrature reception circuit 2B and its subsequent circuits operate in a manner similar to the system A, and thereby the subcarrier B component is demodulated.

Figure 7A:
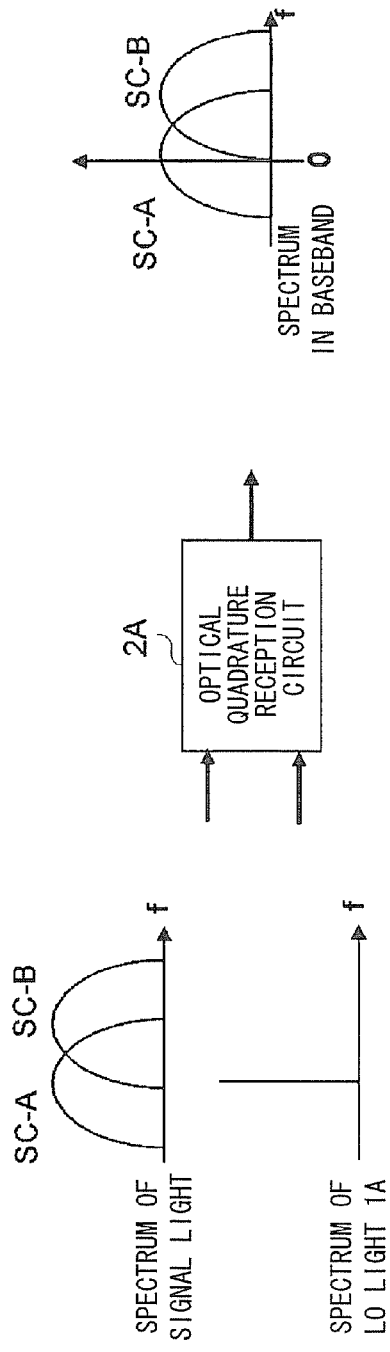
FIG. 7A is an explanatory diagram of a method for setting the frequency of LO light in the third embodiment, and it is a diagram when the frequency of the LO light is set to a frequency in the vicinity of the center frequency of a subcarrier A of signal light.
Figure 7B:
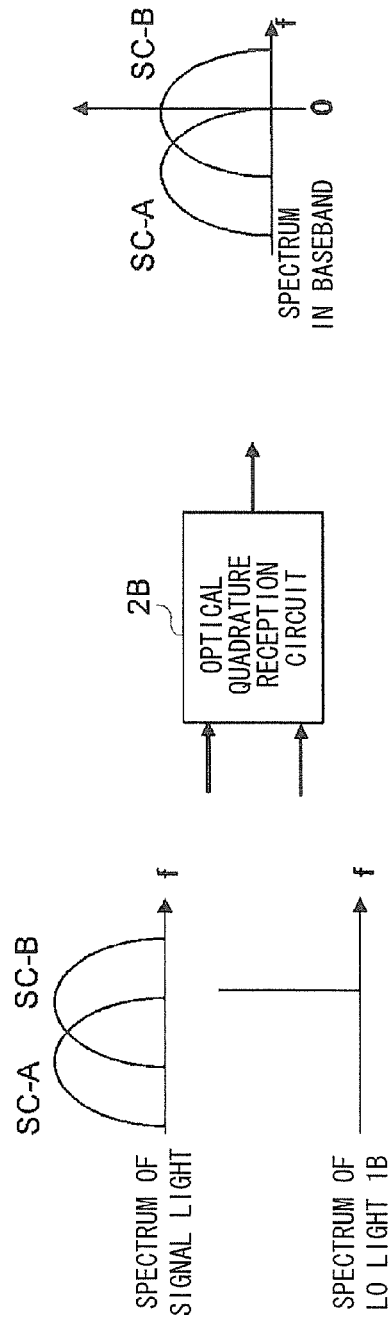
FIG. 7B is an explanatory diagram of a method for setting the frequency of the LO light in the third embodiment, and it is a diagram when the frequency of the LO light is set to a frequency in the vicinity of the center frequency of a subcarrier B of the signal light.

FIG. 7A and FIG. 7B show diagrams explaining a method for setting the frequency of LO light in the third embodiment. As shown in FIG. 7A, the frequency of the LO light 1A is set to a frequency in the vicinity of the center frequency of the subcarrier A of the signal light so that the center frequency of the subcarrier A becomes a frequency in the vicinity of zero when the subcarrier A is converted into baseband. Such a setting makes a frequency shift amount of the frequency shift circuit 4A small. Furthermore, such a setting makes it possible to narrow the frequency band of baseband analog electrical circuits which are required for demodulating the subcarrier A. Moreover, the same advantageous effects can also be obtained with respect to the subcarrier B by setting the frequency of the LO light 1B to a frequency in the vicinity of the center frequency of the subcarrier B of the signal light in a similar manner (refer to FIG. 7B).

Four Embodiment of the Present Invention

Figure 8:
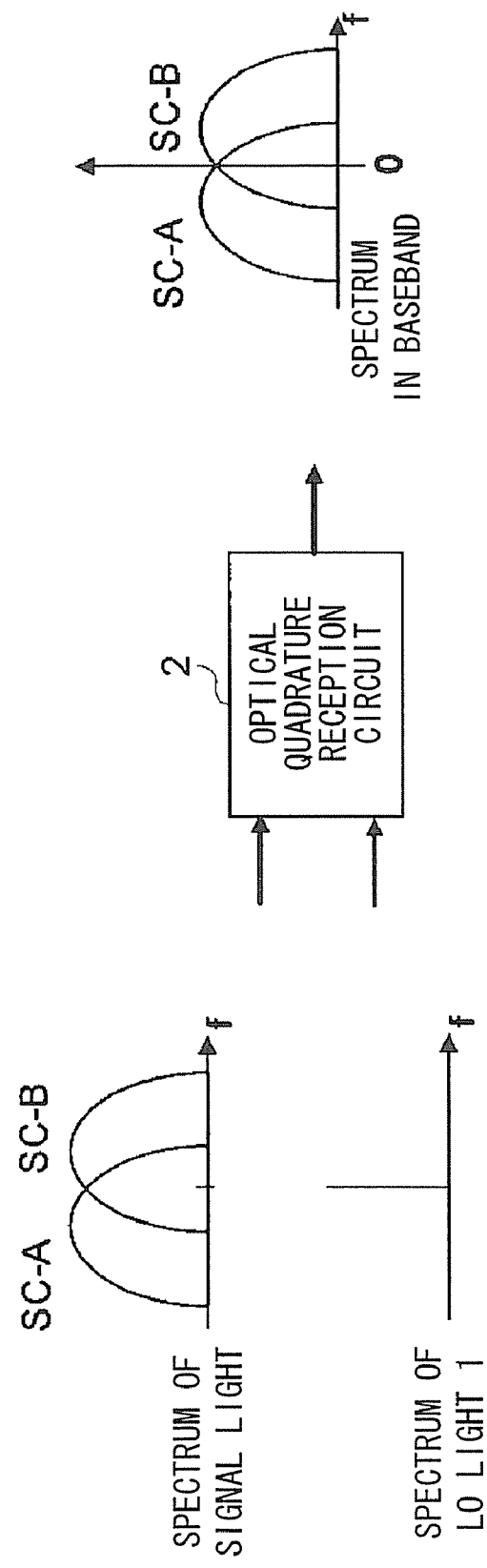
FIG. 8 is an explanatory diagram of a method for setting the frequency of LO light in a fourth embodiment.

The structure of a fourth embodiment of the present invention is similar to that of the first or the second embodiment. However, a method for setting the frequency of LO light 1 is different therefrom. FIG. 8 shows an explanatory diagram of a method for setting the frequency of the LO light in the fourth embodiment. The frequency of the LO light 1 is set to a frequency in the vicinity of the center optical frequency between subcarriers A and B. It is noted that, similar to the above, "vicinity" refers to an optical frequency in a frequency range that an equalizer and a carrier phase recovery circuit is capable of correcting the frequency of the LO light 1 to the center optical frequency between the subcarriers A and B. With such a setting, the center optical frequency between the subcarriers A and B in an OFDM signal which has been converted into baseband becomes a frequency in the vicinity of zero, and the center frequencies of the subcarriers A and B are each shifted by half the frequency corresponding to the interval between the subcarriers. Such a setting makes it possible to minimize the frequency band of baseband analog electrical circuits which are required for demodulating the subcarriers A and B.

By digitizing this analog signal and shifting the frequency by half the frequency corresponding to the interval between the subcarriers by the frequency shift circuit 4, the center frequency of the subcarrier A or B can be set to a frequency in the vicinity of zero, and demodulation can be performed using a structure similar to that of the first or the second embodiment.

Fifth Embodiment of the Present Invention

Figure 9:
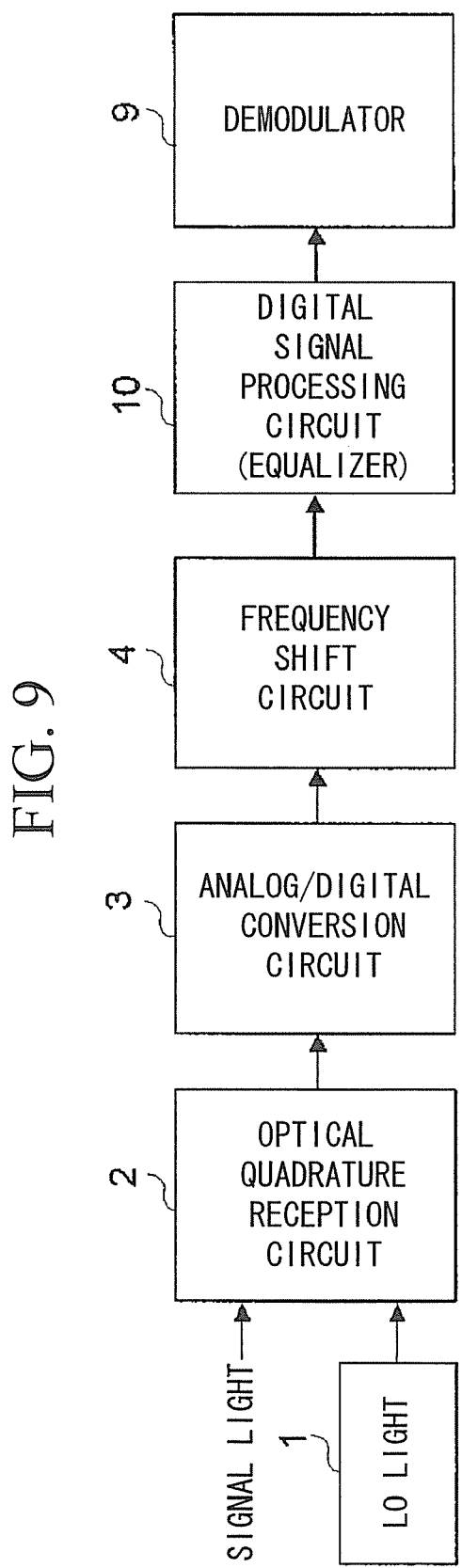
FIG. 9 is a block diagram showing the structure of an optical OFDM receiver in accordance with a fifth embodiment.

The structure of an optical OFDM receiver in accordance with a fifth embodiment of the present invention will be explained with reference to FIG. 9. FIG. 9 is a block diagram showing the structure of the optical OFDM receiver in accordance with the fifth embodiment of the present invention. Reference symbol 10 denotes a digital signal processing circuit, and the digital signal processing circuit of the fifth embodiment is an equalizer in which the coefficients of a transversal filter are set so as to match an OFDM subcarrier separation computation.

In this way, in the case in which an equalizer configured by a transversal filter is used as the equalizer, delay elements and adders (or subtractors) for an OFDM subcarrier separation computation need not be used if the coefficients of the transversal filter are set so as to match an OFDM subcarrier separation computation. In the absence of intersymbol interference, a subcarrier A component among two subcarriers is extracted by, for example, setting the coefficient for a tap of the transversal filter with a ½ symbol delay and the coefficient for a signal tap without delay to 1:1. Moreover, a subcarrier B component is extracted by, for example, setting the coefficient for the tap of the transversal filter with a ½ symbol delay and the coefficient for the signal tap without delay to 1:−1. To this end, for example, there is provided means for selecting any one of modes including: a first mode in which the coefficients of the transversal filter are set so as to add a signal input to the transversal filter to a signal obtained by delaying this input signal by ½ of a symbol time; and a second mode in which the coefficients of the transversal filter are set so as to subtract the signal obtained by delaying the signal input to the transversal filter by ½ of a symbol time from this input signal. In the presence of intersymbol interference, the coefficients are optimized by an adaptive equalization algorithm, although it is not simple, and the subcarrier A component or the subcarrier B component can be obtained.

Sixth Embodiment of the Present Invention

Figure 10:
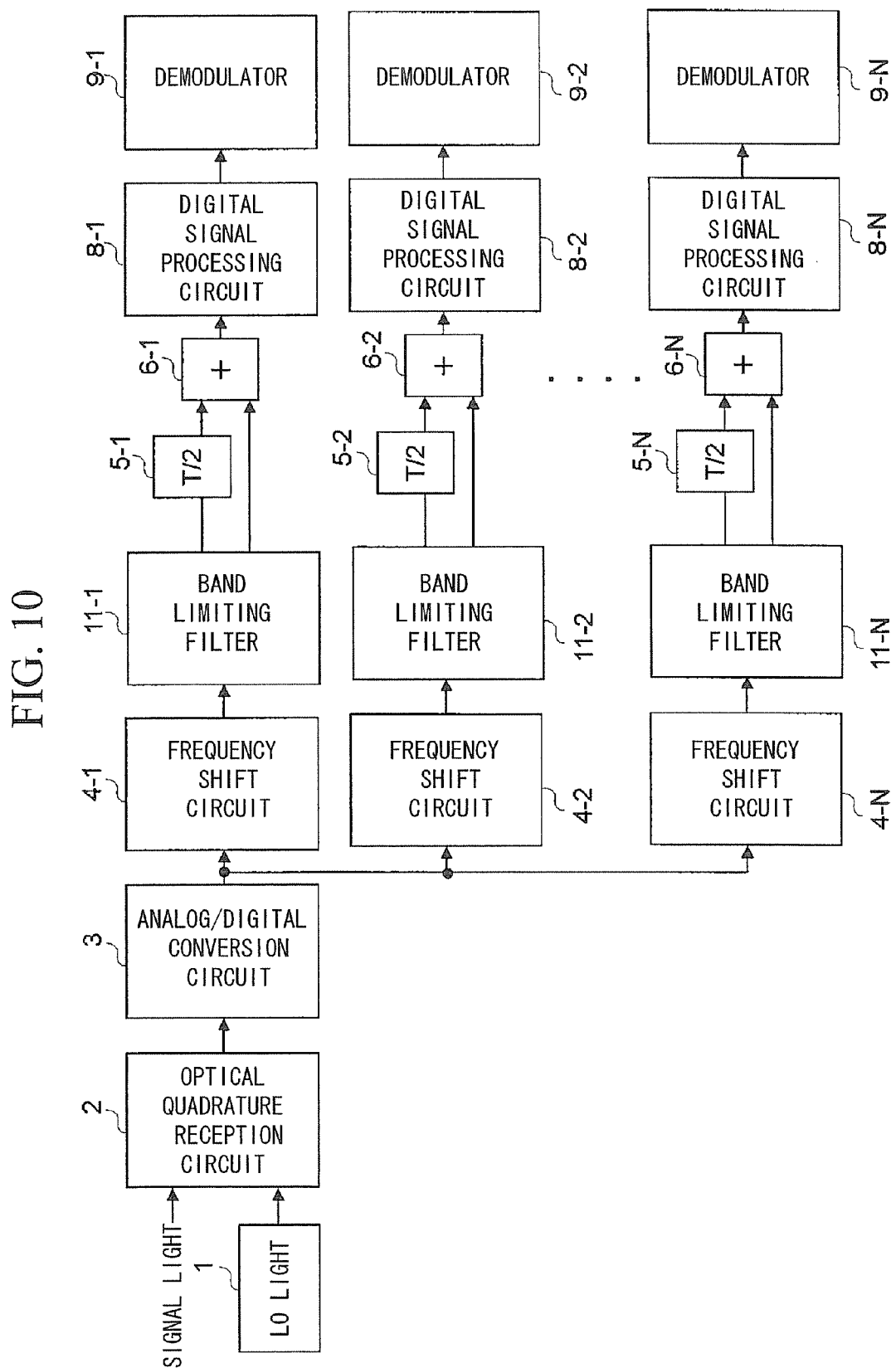
FIG. 10 is a block diagram showing the structure of an optical OFDM receiver in accordance with a sixth embodiment.

An optical OFDM receiver of a sixth embodiment of the present invention will be explained with reference to FIG. 10. FIG. 10 is a block diagram showing the structure of the optical OFDM receiver in accordance with the sixth embodiment of the present invention. The structure in which a received signal (signal light) is an N-subcarrier optical OFDM signal is different from that of the second embodiment. The frequency of a converted digital electrical signal is shifted by frequency shift circuits 4-1, 4-2, . . . , and 4-N so that the center frequency of a desired subcarrier becomes zero, the bands are limited by band limiting filters 11-1, 11-2, . . . , and 11-N so that signals in the same pass band as the signal bandwidth of the desired subcarrier are passed therethrough, and then the operations of subcarrier separation circuits and their subsequent circuits are performed. Thereby, a signal of the desired subcarrier can be obtained.

It is noted that the reason why the bands are limited by the band limiting filters 11-1, 11-2, . . . , and 11-N is as follows. Assuming that a subcarrier to be separated is k, a subcarrier (k−1) and a subcarrier (k+1) which are adjacent on the both sides of the subcarrier k and whose spectra in baseband overlap with the subcarrier k can be removed by the computation of a sum by an adder. However, in the presence of subcarriers (k−2) and (k+2) which are respectively adjacent to the subcarriers (k−1) and (k+1), these subcarriers (k−2) and (k+2) are not removed by the computation of the sum and they are output from the adder. Similarly, a subcarrier (k−4), a subcarrier (k+4), or the like are also not removed by the computation of the sum and they are output from the adder. Accordingly, for example, the bands are limited to using band limiting filters so that the signals in the same pass band as the signal bandwidth of the subcarrier k are passed therethrough. By doing so, only the desired subcarrier k is separated by the adder.

Seventh Embodiment of the Present Invention

Figure 11:
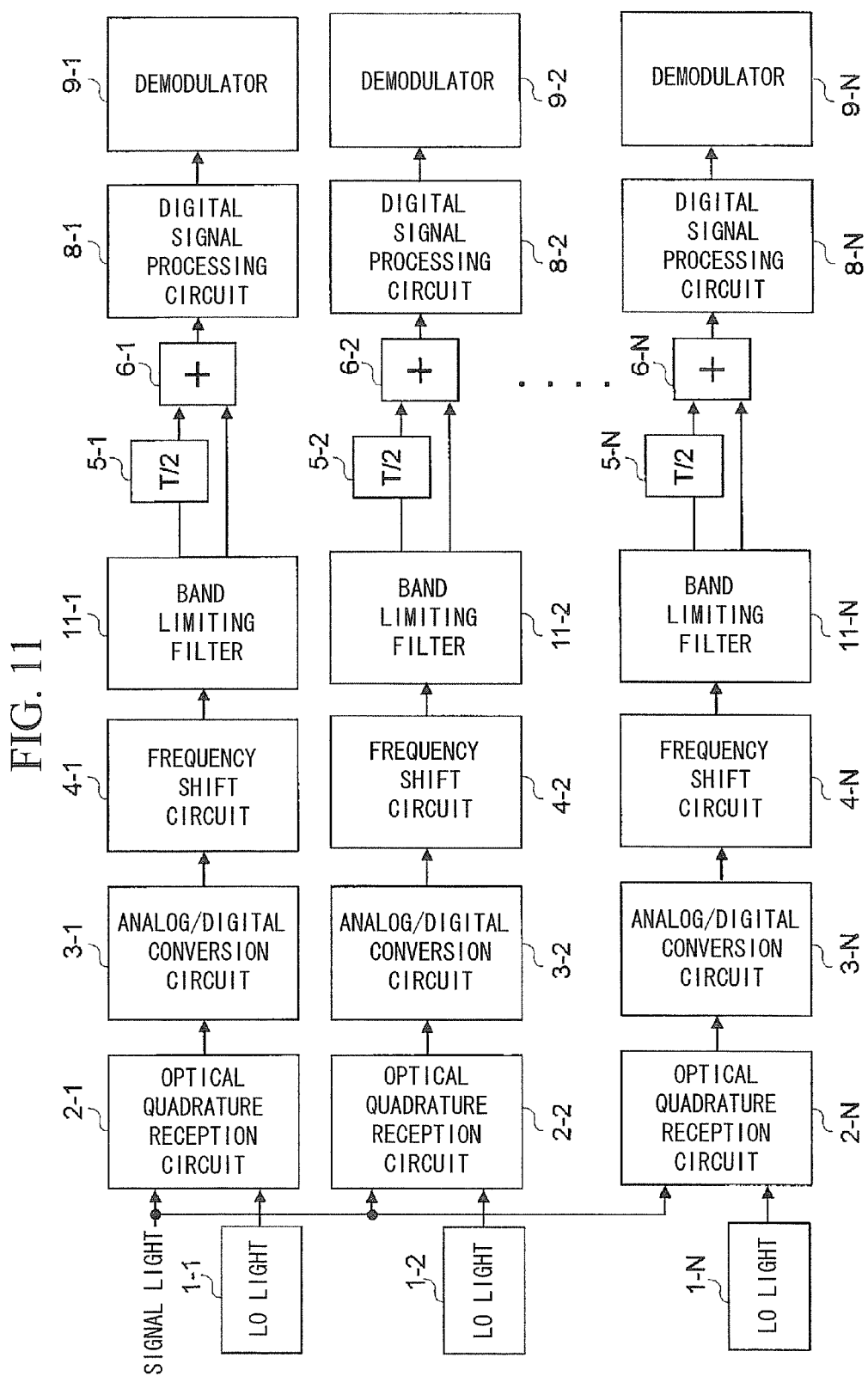
FIG. 11 is a block diagram showing the structure of an optical OFDM receiver in accordance with a seventh embodiment.

The structure of an optical OFDM receiver in accordance with a seventh embodiment of the present invention will be explained with reference to FIG. 11. FIG. 11 is a block diagram showing the structure of the optical OFDM receiver in accordance with the seventh embodiment of the present invention. The structure in which a received signal (signal light) is an N-subcarrier optical OFDM signal is different from that of the third embodiment. Optical OFDM receivers are provided for N systems, and signal light is divided into N, which are input into the respective optical OFDM receivers.

The optical frequencies of respective LO light 1-1, 1-2, . . . , and 1-N are set so as to match the center frequencies of respective subcarriers of the optical OFDM signal consisting of the N subcarriers, or they are set to frequencies in the vicinity thereof. The frequencies are shifted by frequency shift circuits 4-1, 4-2, ..., and 4-N so that the center frequencies of the respective subcarriers become zero, the bands are limited by band limiting filters 11-1, 11-2, ..., and 11-N so that signals in the same pass band as the signal bandwidth of a desired subcarrier are passed therethrough, and the operations of subcarrier separation circuits and their subsequent circuits are performed. Thereby, a signal of the desired subcarrier can be obtained.

Figure 12:
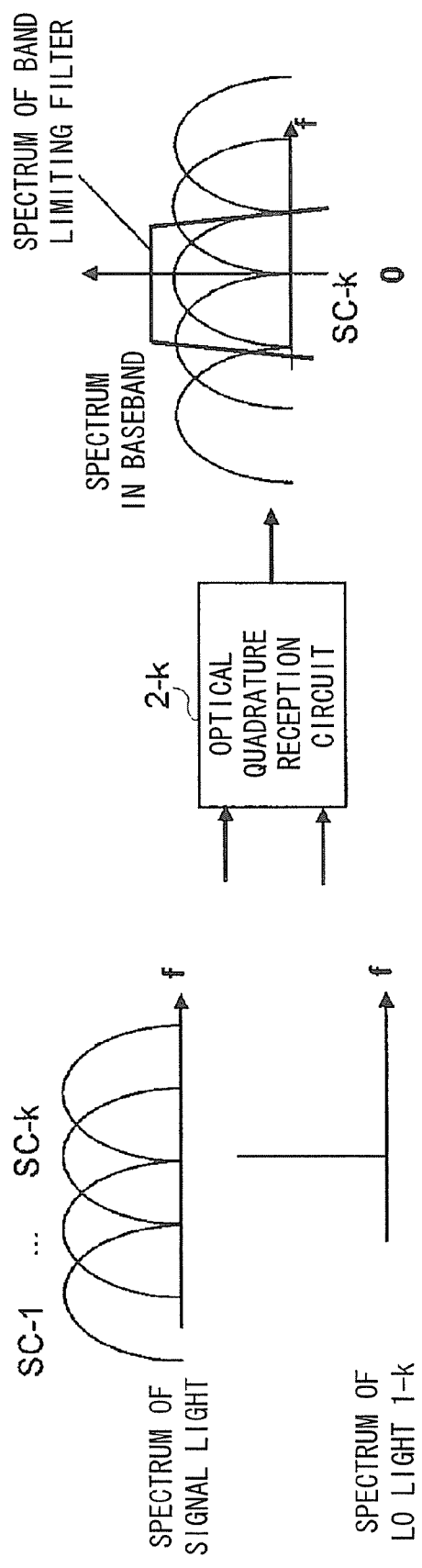
FIG. 12 is an explanatory diagram of a method for setting the frequency of LO light in the seventh embodiment.

FIG. 12 is an explanatory diagram of a method for setting the frequency of LO light in the seventh embodiment. The case in which a k-th (where k is an integer in the range of 1 to N) subcarrier is obtained is shown. The frequency of LO light 1-$k$ is set to a frequency in the vicinity of the center frequency of the k-th subcarrier of the optical OFDM signal consisting of the N subcarriers. With such a setting, the center frequency of the k-th subcarrier which is converted into baseband becomes a frequency in the vicinity of zero. Thereby, a frequency shift amount required for a frequency shift circuit 4-$k$ becomes small, and the frequency band of baseband analog electrical circuits required for demodulation can be reduced.

Eighth Embodiment of the Present Invention

Figure 13:
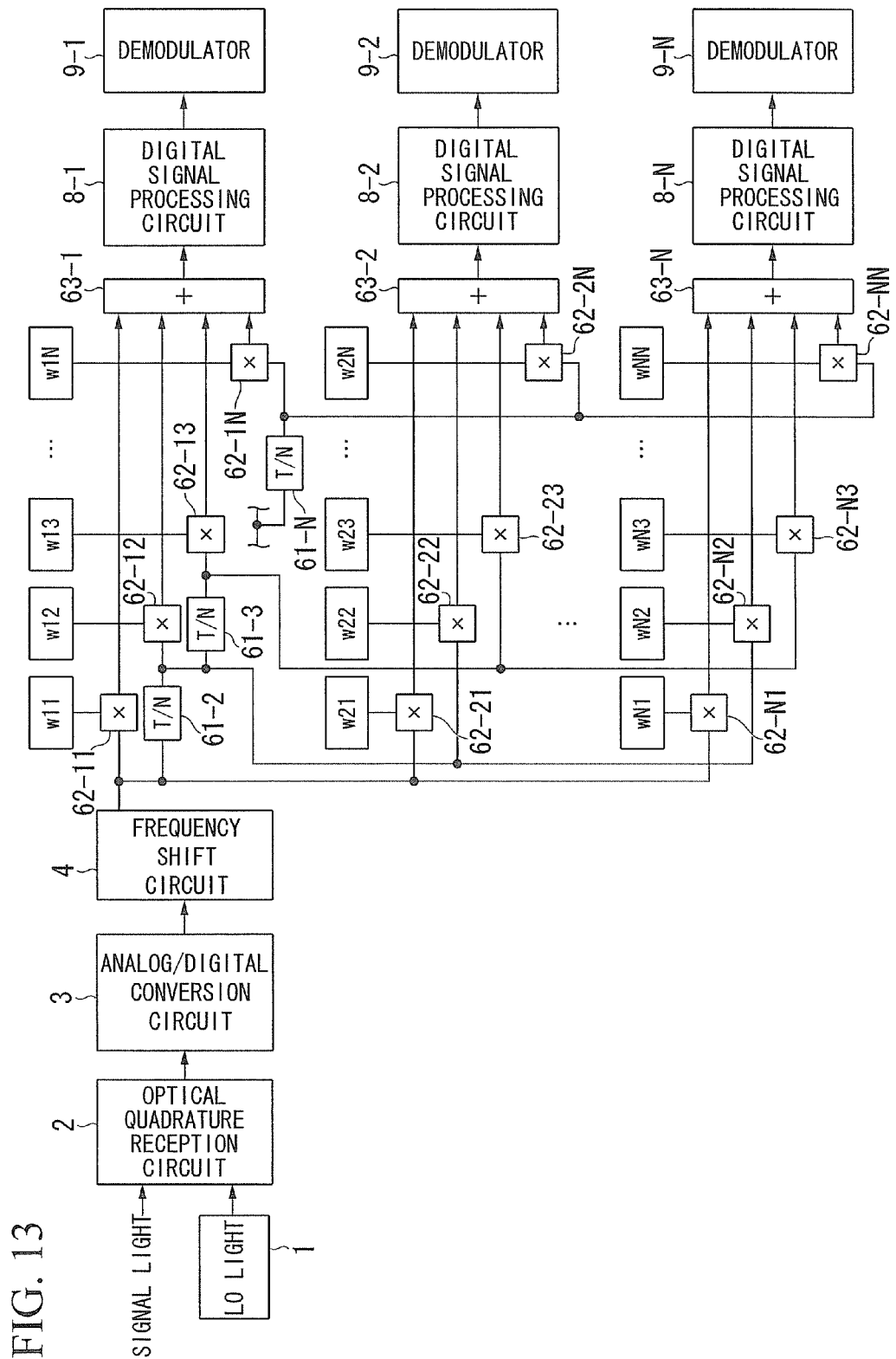
FIG. 13 is a block diagram showing the structure of an optical OFDM receiver in accordance with an eighth embodiment.

The structure of an optical OFDM receiver in accordance with an eighth embodiment of the present invention will be explained with reference to FIG. 13. FIG. 13 is a block diagram showing the structure of the optical OFDM receiver in accordance with the eighth embodiment of the present invention. A received signal (signal light) is an N-subcarrier optical OFDM signal, and the structure up to and including an analog/digital conversion circuit 3 is the same as that of the other embodiments. A frequency shift circuit 4 shifts the frequency of a converted digital electrical signal so that the center frequency of the lowest or the highest subcarrier becomes zero.

An electrical signal output from the frequency shift circuit 4 is divided, and the symbol phases thereof are delayed by times determined by (k/N)T [s] (where k are integers from 0 to N−1, and T is one symbol time) by delay elements 61-2 to 61-N to output N signals (hereinafter referred to as signals Ek). It is noted that since the electrical signal output from the frequency circuit 4 is not delayed in the case in which k is 0, the signal E0 is identical to the output of the frequency shift circuit 4. Moreover, the signal E1 is a signal output from the delay element 61-2, and the signal E2 is a signal output from the delay element 61-3. Similarly, the signal EN is a signal output from the delay element 61-N. A subcarrier is separated by adding the N signals Ek by an adder. There are N adders (a 0-th adder 63-1 to an (N−1)-th adder 63-N), and N subcarriers can be separated. A subcarrier can be separated by multiplying a k-th input signal among the signals input to an l-th adder (where is an integer in the range of 0 to N−1, and j is an imaginary unit) by a coefficient related to phase determined by the following equation (i.e., the portion other than "·Ek", hereinafter referred to as a coefficient wlk).

[Equation 3]

$$e^{-j\frac{2\pi}{N}k \cdot l} \cdot E_k \quad (1)$$

Specifically, the output of the frequency shift circuit 4 is multiplied by the coefficients w11, w21, ..., and wN1 using multipliers 62-11, 62-21, ..., and 62-N1, respectively. Additionally, the output of the delay element 61-2 is multiplied by the coefficients w12, w22, ..., and wN2 using multipliers 62-12, 62-22, ..., and 62-N2, respectively. Additionally, the output of the delay element 61-3 is multiplied by the coefficients w13, w23, ..., and wN3 using multipliers 62-13, 62-23, ..., and 62-N3, respectively. Similarly, the output of the delay element 61-N is multiplied by the coefficients w1N, w2N, ..., and wNN using multipliers 62-1N, 62-2N, ..., and 62-NN, respectively.

Moreover, subcarriers can be separated even if the frequency is not shifted so that the center frequency of the lowest or the highest subcarrier becomes zero. In this case, the coefficients are different from those of Equation (1).

Furthermore, an N-subcarrier separation circuit which is configured by these delay elements, the multipliers, and the adders, to which the outputs of the multipliers are supplied, is just an N-th order transversal filter having (1/N)T delay taps, and in the absence of intersymbol interference, the N-subcarrier separation circuit can be omitted by setting the coefficients of transversal filters of equalizers included in digital signal processing circuits 8-1 to 8-N to those as determined by Equation (1). As a specific example, N-th order transversal filter-type adaptive equalizers having (1/N)T delay taps (N taps) are used as the equalizers included in the digital signal processing circuits 8-1 to 8-N. These transversal filter-type adaptive equalizers are each provided with multiplying means for multiplying a k-th (where k is an integer in the range of 0 to N−1) input signal Ek, which is input to an l-th (where l is an integer in the range of 0 to N−1) output terminal, by the tap coefficient determined by Equation (1) (i.e., the portion other than "·Ek"), and perform digital signal processing for multiplying these tap coefficients.

The coefficients of a transversal filter are determined by optimizing adaptive equalization using the CMA or another algorithm so that N subcarriers can be separated. After equalization and carrier phase recovery, demodulators 9-1, ..., and 9-N demodulate N-subcarrier transmission symbols. Similarly, subcarriers can be separated using only N-th order transversal filters each having (1/N)T delay taps even if the frequency is not shifted so that the center frequency of the lowest or the highest subcarrier becomes zero. In this case, the coefficients are different from those of Equation (1).

Ninth Embodiment of the Present Invention

A ninth embodiment of the present invention is directed to the case in which signal light is polarization-division multiplexed signal light. All the structures of the optical OFDM receives in the foregoing embodiments can even be applied to the case in which signal light is a polarization-division multiplexed signal. However, the optical quadrature reception circuit 2 is required to have a polarization diversity structure. As the structure including the digital signal processing circuit 8 and its subsequent circuits, digital signal processing circuits and demodulators must be provided for two systems for X-polarization and Y-polarization. An adaptive equalization circuit can realize polarization separation by means of the same algorithm. Additionally, if an optical frequency for X-polarization is not exactly the same as that for Y-polarization, the circuit structure including the frequency shift circuit 4 and its subsequent circuits must be provided for two systems for X-polarization and Y-polarization.

Figure 14:
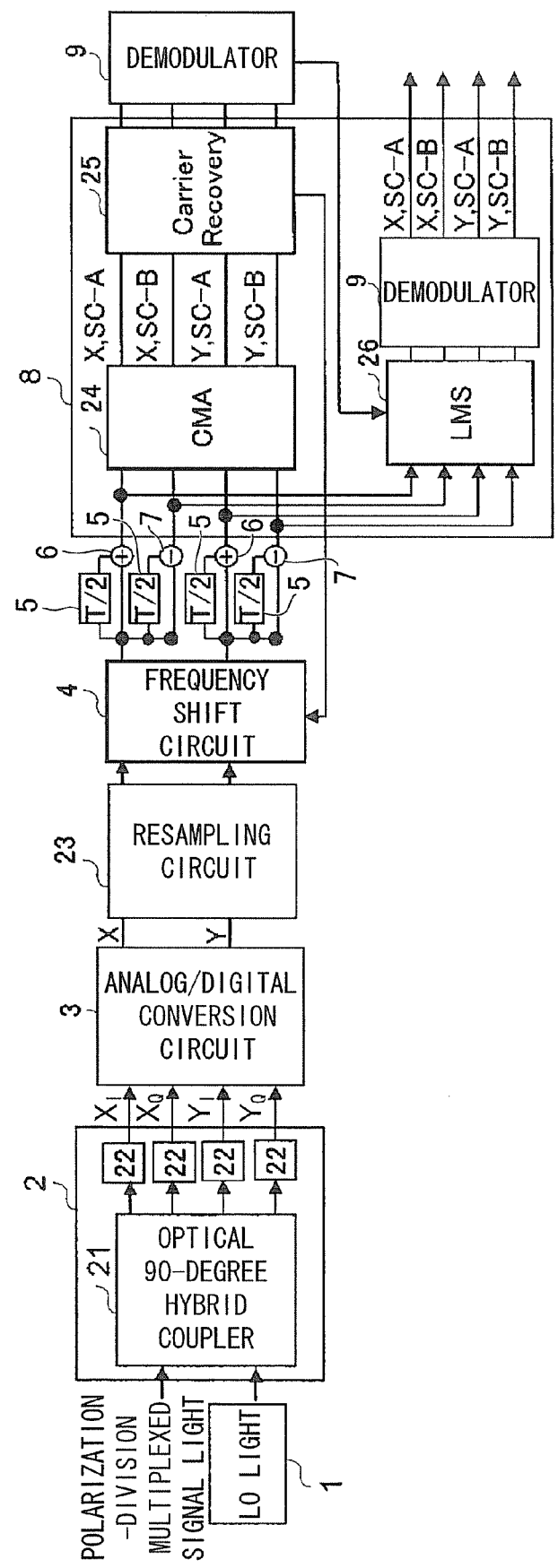
FIG. 14 is a block diagram showing a specific example of the structure of an optical OFDM receiver in accordance with a ninth embodiment.

FIG. 14 illustrates a block diagram showing a specific example of the structure of an optical OFDM receiver in accordance with the ninth embodiment. The structure in which signal light input into a 90-degree hybrid coupler 21 is polarization-division multiplexed two-subcarrier OFDM signal light is different from that of FIG. 2. Moreover, the structure in which adaptive equalizers 24 and 26 output two sets of signals for X-polarization and Y-polarization is different from that of FIG. 2. A CMA equalizer (the adaptive equalizer 24) and an LMS equalizer (the adaptive equalizer 26) also provide a polarization separation function, and four outputs including a subcarrier A for X-polarization (X, SC-A); a subcarrier B for X-polarization (X, SC-B); a subcarrier A for Y-polarization (Y, SC-A); and a subcarrier B for Y-polarization (Y, SC-B) can be obtained.

Tenth Embodiment of the Present Invention

Figure 15:
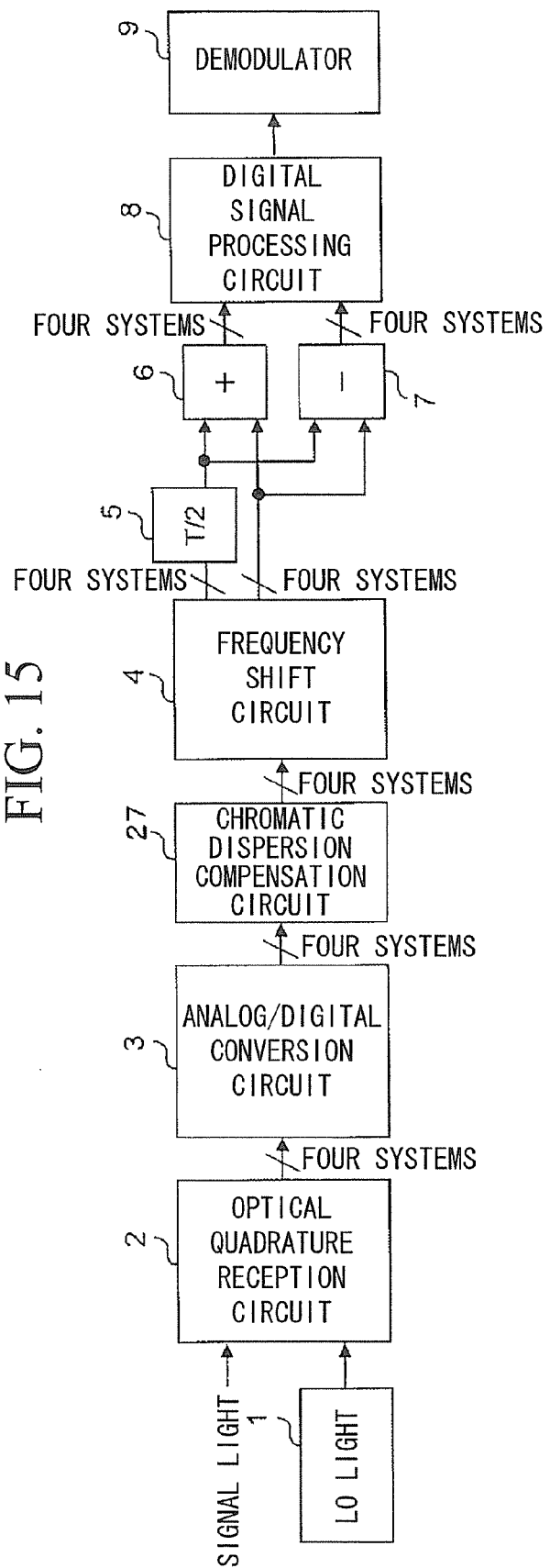
FIG. 15 is a block diagram showing the structure of an optical OFDM receiver in accordance with a tenth embodiment.

A tenth embodiment of the present invention will be explained with reference to FIG. 15 and FIG. 16. FIG. 15 is a block diagram showing the structure of an optical OFDM receiver in the tenth embodiment of the present invention. The present embodiment is characterized by disposing a chromatic dispersion compensation circuit 27 as the subsequent stage of an analog/digital conversion circuit 3. Optical signals propagated through optical fibers are subjected to the influence of a frequency-dependent delay due to chromatic dispersion of the optical fibers, and they interfere with adjacent symbols. As a result, a problem is caused in that the symbol error rate after reception is deteriorated.

Conventional direct detection-type receivers employ a method for compensating for dispersion using an optical dispersion compensation device prior to performing an OE conversion. In this method, the compensable dispersion amount is significantly limited by the loss, the size, the limitations on a pass band, or the like of the optical dispersion compensation device. In contrast, the present embodiment is characterized in that since dispersion of a digital signal which has been subjected to an OE conversion and an analog/digital conversion is compensated for using digital signal processing, chromatic dispersion can be compensated for without being affected by the loss and the limitations on band or the like, and the dispersion compensation amount can be greatly increased.

As shown in FIG. 15, the present embodiment is provided with chromatic dispersion compensation circuits 27 for four systems for in-phase/orthogonal components and X/Y polarizations. Since each of the chromatic dispersion compensation circuits 27 is required to apply a delay opposite to the chromatic dispersion of a transmission line, the present embodiment employs a transversal filter as shown in FIG. 16. Assuming that the chromatic dispersion of the transmission line is D, a response function of a chromatic dispersion compensation circuit 27 in the frequency domain is represented by $$H(f) = \exp(-j(\pi\lambda^2 D f^2/c)) \quad (2),$$

where c is the speed of light, and $\lambda$ is the wavelength of the signal.

The coefficients of a transversal filter can be obtained from an impulse response of Equation (2) by performing an inverse Fourier transform. When a two-subcarrier polarization-division multiplexed OFDM signal of 111 Gbit/s is used, the sampling rate is 55.5 GS/s, and single-mode fibers having zero dispersion at 1.3 μm and a length of 3,000 km (a dispersion amount of 62,000 ps/nm) are used, it is possible to sufficiently suppress the penalty due to chromatic dispersion if the order (m) of the transversal filter is set to approximately 4,096.

It is noted that it is more effective to set the frequency of LO light 1 to a frequency around the center of an OFDM signal (in the case of two subcarriers, in the vicinity of the center frequency between subcarriers A and B). This is because requirements for the band of the analog/digital conversion circuit 3 at the subsequent stage can be mitigated and an error in a chromatic dispersion amount caused by the frequency difference between the LO light 1 and each subcarrier can be minimized.

If the value of chromatic dispersion is known through, for example, a preliminary measurement, it is sufficient to set the coefficients of the transversal filter to fixed values, so that it is not necessary to apply an adaptive algorithm such as the CMA. For this reason, a reduction in a computation amount is expected compared to the case in which an adaptive filter is used.

Figure 16:
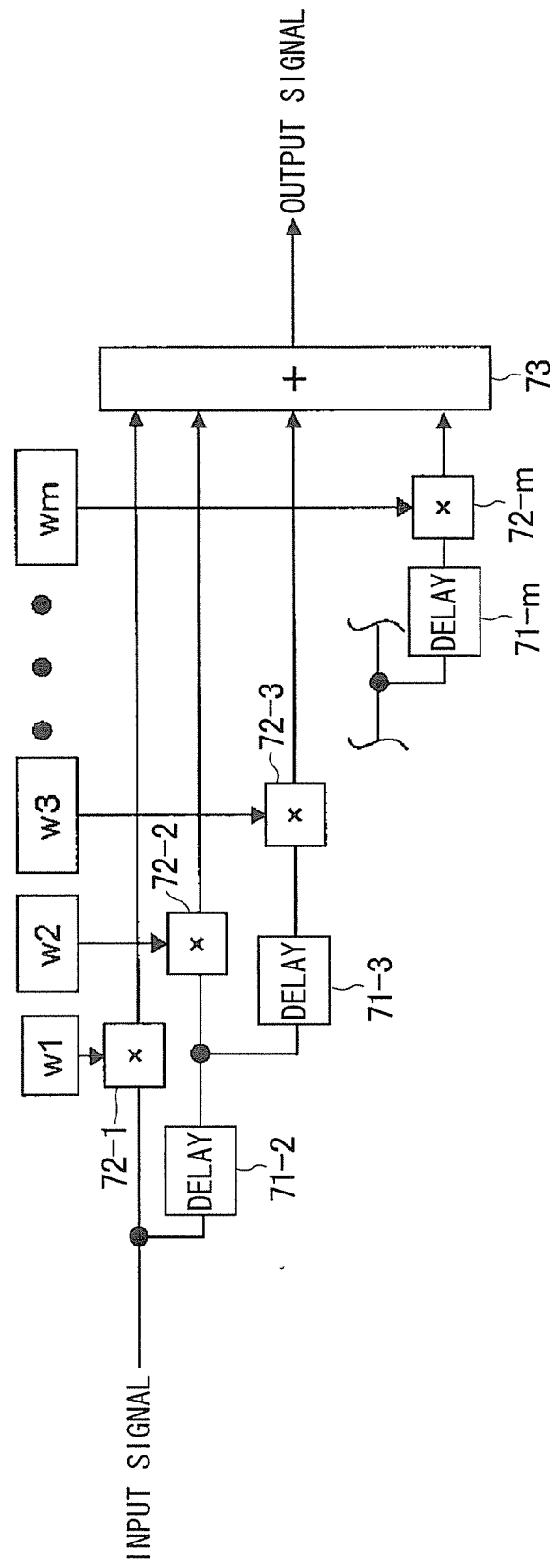
FIG. 16 is a diagram showing a transversal filter of a chromatic dispersion compensation circuit shown in FIG. 15.

It is noted that the transversal filter shown in FIG. 16 is configured by delay elements 71-2 to 71-m which sequentially delay an input signal; a multiplier 72-1 which multiplies the input signal by a coefficient w1; multipliers 72-2 to 72-m which multiply signals delayed by the delay elements 71-2 to 71-m by coefficients w2 to wm, respectively; and an adder 73 which adds the outputs of the multipliers 72-1 to 72-m.

Eleventh Embodiment of the Present Invention

Figure 17:
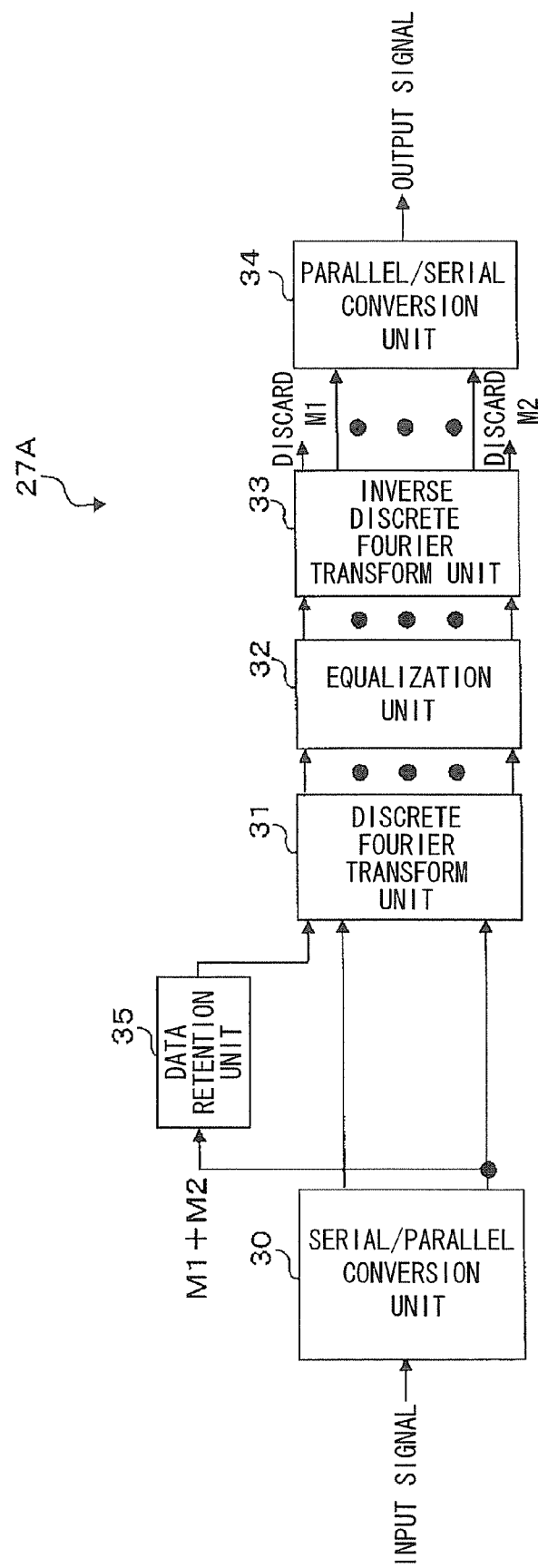
FIG. 17 is a block diagram showing the structure of a chromatic dispersion compensation circuit in accordance with an eleventh embodiment.
Figure 18:
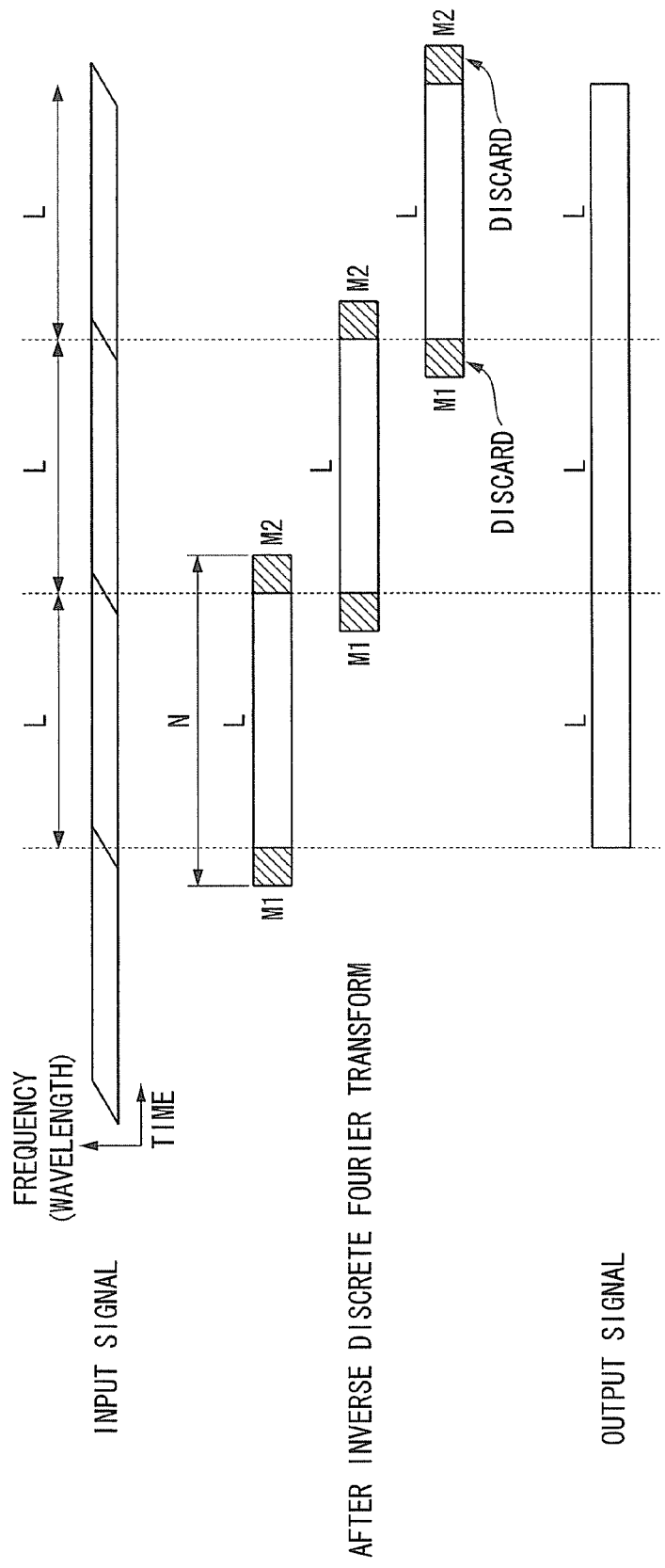
FIG. 18 is a diagram for explaining the operation of the chromatic dispersion compensation circuit shown in FIG. 17.

An eleventh embodiment of the present invention will be explained with reference to FIG. 17 and FIG. 18. FIG. 17 is a block diagram showing the structure of a chromatic dispersion compensation circuit 27A of an optical OFDM receiver in the eleventh embodiment of the present invention. The present embodiment is characterized by performing a discrete Fourier transform of a received signal in the time domain and performing equalization in the frequency domain.

The operation of chromatic dispersion compensation of the present embodiment will be explained with reference to FIG. 18. The vertical axis of FIG. 18 denotes frequency and the horizontal axis denotes time. Due to the influence of chromatic dispersion, respective subcarriers of an input signal have different propagation delay times depending on wavelength. The reason why input signals shown in FIG. 18 are illustrated by using parallelograms is to represent the fact that the propagation delay times of the respective subcarriers are different from one another. Accordingly, since the influence by chromatic dispersion results in the difference in propagation delay times between the respective subcarriers, compared to the length L of an input signal as shown at the upper portion of FIG. 18, protruding portions such as M1 and M2 are generated in optical signals as shown at the middle portion of FIG. 18. As a result, the length of an optical signal which has been subjected to the influence of chromatic dispersion becomes N (>L) because the lengths of the protruding portions M1 and M2 are added to the length L of an input signal.

Therefore, even if a discrete Fourier transform is applied to these input signals in units of a block consisting of L pieces of data, normal dispersion compensation cannot be done because signals in the vicinity of the both ends interfere with signals of the adjacent blocks. In order to avoid this, it is sufficient to perform a discrete Fourier transform process and an inverse Fourier transform process using total N (=L+M1+M2) pieces of data, which are generated by adding immediately before M1 pieces of data and immediately after M2 pieces of data to the L pieces of data, as one block. Here, the time width of M1 and M2 need to be larger than the delay amount caused by chromatic dispersion.

In the chromatic dispersion compensation circuit 27A of the present embodiment, a serial/parallel conversion unit 30 performs a serial/parallel conversion of an input signal using N pieces of data as one block, a discrete Fourier transform unit 31 applies a discrete Fourier transform to convert it into a signal in the frequency domain, an equalization unit 32 applies phase rotation given by Equation (2) to the respective frequency components, and an inverse discrete Fourier transform unit 33 applies an inverse discrete Fourier transform to convert it into a signal in the time domain. In this case, since signals in the vicinity of the both ends of each block (the first half portion: M1 points, and the second half portion: M2 points) include interferences from the adjacent blocks, these portions need to be discarded. It is noted that a parallel/serial conversion unit 34 performs a parallel/serial conversion of a signal output from the inverse discrete Fourier transform unit 33.

For this reason, a data retention unit 35 retains M1+M2 pieces of data included in the second half of the output from the serial/parallel conversion unit 30 as shown in FIG. 17, and reads them on the first half portion of the next block in the time domain. Subsequently, after performing a discrete Fourier transform, phase rotation given by Equation (2) is applied and an inverse discrete Fourier transform is performed to restore it to the time domain. In this case, M1 pieces of data and M2 pieces of data at the both ends of each block in the time domain are removed, and L (=N−M1−M2) pieces of data at the middle portion are concatenated to obtain a signal for which chromatic dispersion has been normally compensated.

It is needless to say that it is possible to realize efficient computation in the discrete Fourier transform unit 31 and the inverse discrete Fourier transform unit 33 of the present embodiment by respectively applying a fast Fourier transform algorithm and an inverse fast Fourier transform algorithm with the number of pieces of data N of one block being set to a power of two. In this case, the computation amount becomes an order of $N \log_2 N$. In contrast, when configured with a transversal filter, the computation amount increases in accordance with $N^2$. For this reason, the present embodiment is advantageous in respect of reduction in a computation amount when there are a great number of taps.

Moreover, by disposing the chromatic dispersion compensation circuit 27A as a previous stage of the digital signal processing circuit 8 as employed in the present embodiment, the number of taps of an equalizer used in the digital signal processing circuit 8 can be kept small, the computational load can be reduced, and tolerance to temporal fluctuations of channels can be improved.

Twelfth Embodiment of the Present Invention

Figure 19:
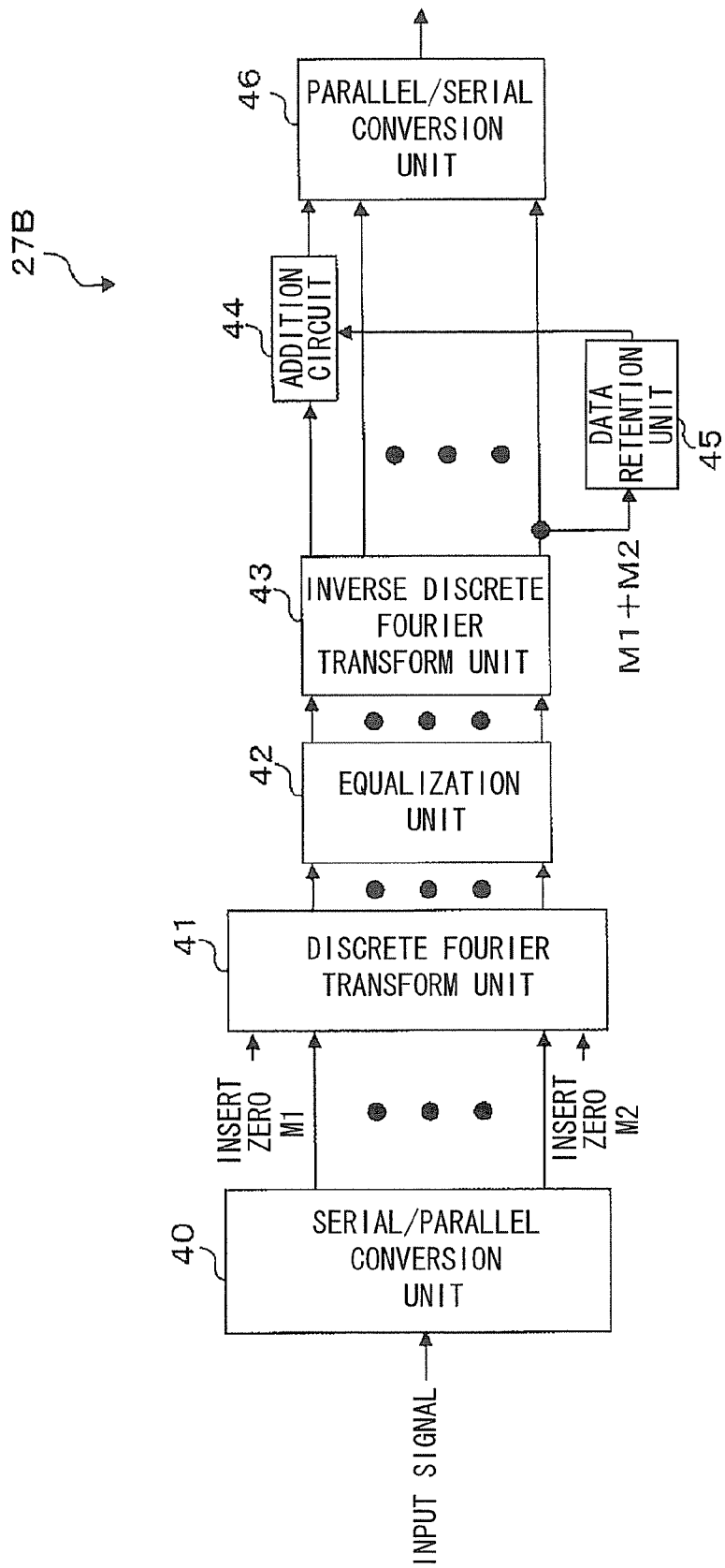
FIG. 19 is a block diagram showing the structure of a chromatic dispersion compensation circuit of an optical OFDM receiver in accordance with a twelfth embodiment.
Figure 20:
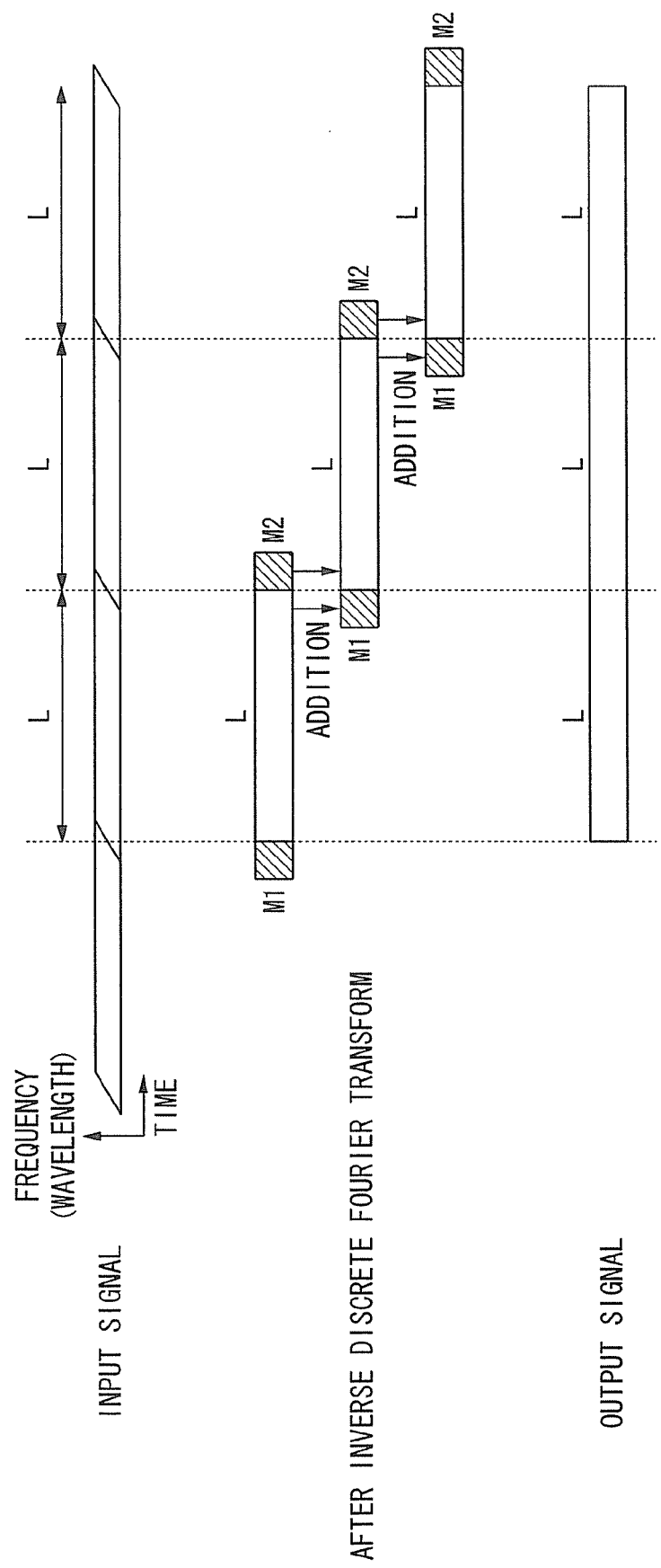
FIG. 20 is a diagram for explaining the operation of the chromatic dispersion compensation circuit shown in FIG. 19.

A twelfth embodiment of the present invention will be explained with reference to FIG. 19 and FIG. 20. FIG. 19 is a block diagram showing the structure of a chromatic dispersion compensation circuit 27B of an optical OFDM receiver in the twelfth embodiment of the present invention. In the present embodiment, a serial/parallel conversion unit 40 performs a serial/parallel conversion using L pieces of data of an input signal as one block, and a discrete Fourier transform unit 41 appends M1 pieces of data and M2 pieces of data, the value thereof being zero, to the head and the tail of L pieces of data, respectively, to form a block of N (=L+M1+M2) pieces of data. A discrete Fourier transform is then applied to this block. Moreover, an equalization unit 42 applies phase rotation, an inverse discrete Fourier transform unit 43 performs an inverse discrete Fourier transform process, and a parallel/serial conversion unit 46 performs a parallel/serial conversion on signals output from the inverse discrete Fourier transform unit 43 and an addition circuit 44. As a result, interference components with the preceding symbol are stored in M1 pieces of data in the first half of N pieces of output data, and in the portion of the subsequent M2 pieces of data, the values obtained by subtracting the interference components with the preceding symbol therefrom are stored.

Similarly, interference components with the next symbol are stored in the portion of the last M2 pieces of the N pieces of data, and in the portion of M1 pieces of data immediately before the last M2 pieces of data, the values obtained by subtracting the interference components with the next symbol therefrom are stored. Therefore, as shown in FIG. 20, the addition circuit 44 adds M1+M2 pieces of data in the second half of N pieces of data retained in a data retention unit 45 to data of the next block, thereby making it possible to remove intersymbol interferences and realizing a dispersion compensation function.

Even in the case of the present embodiment, compared to the case in which a transversal filter is used, a reduction in a computation amount can be expected by using FFT and IFFT. Moreover, since zeros are inserted, an advantageous effect of reducing a computation amount in the FFT calculation can be expected by omitting computation for this portion.

Thirteenth Embodiment of the Present Invention

Figure 21:
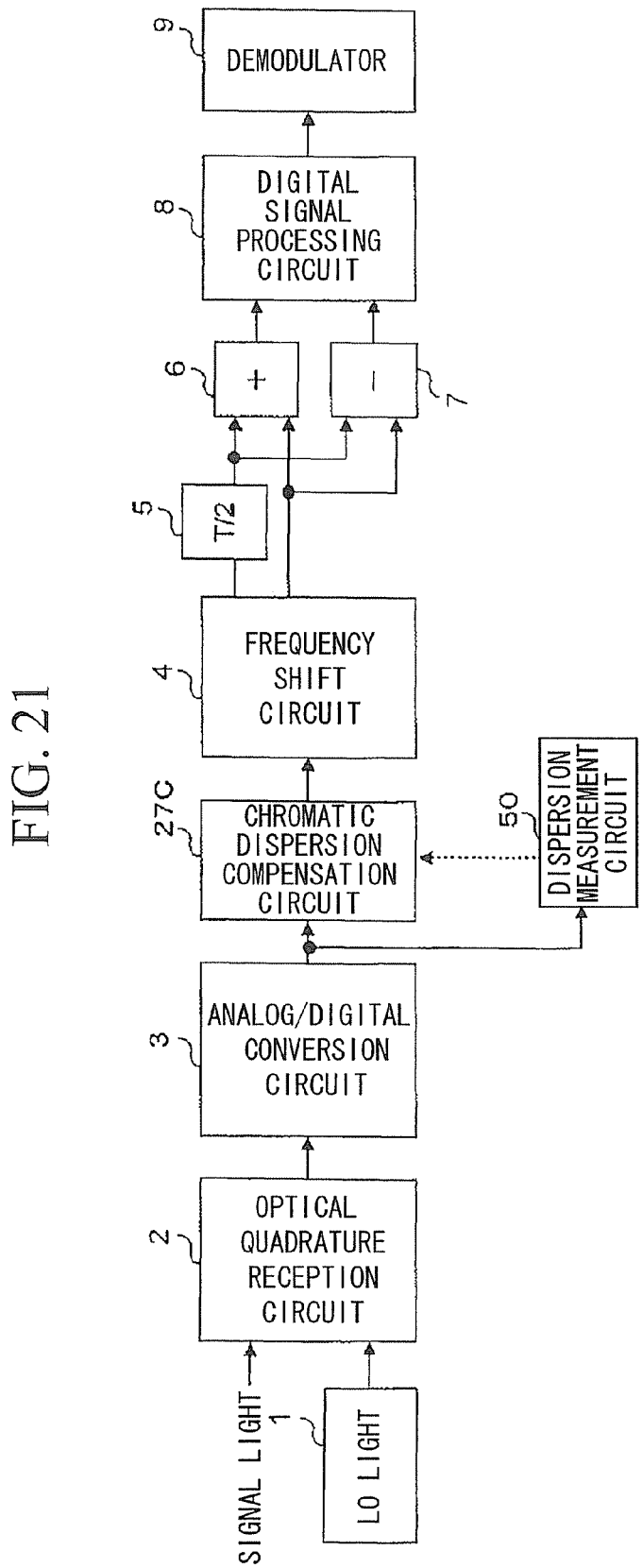
FIG. 21 is a block diagram showing the structure of an optical OFDM receiver in accordance with a thirteenth embodiment.
Figure 22:
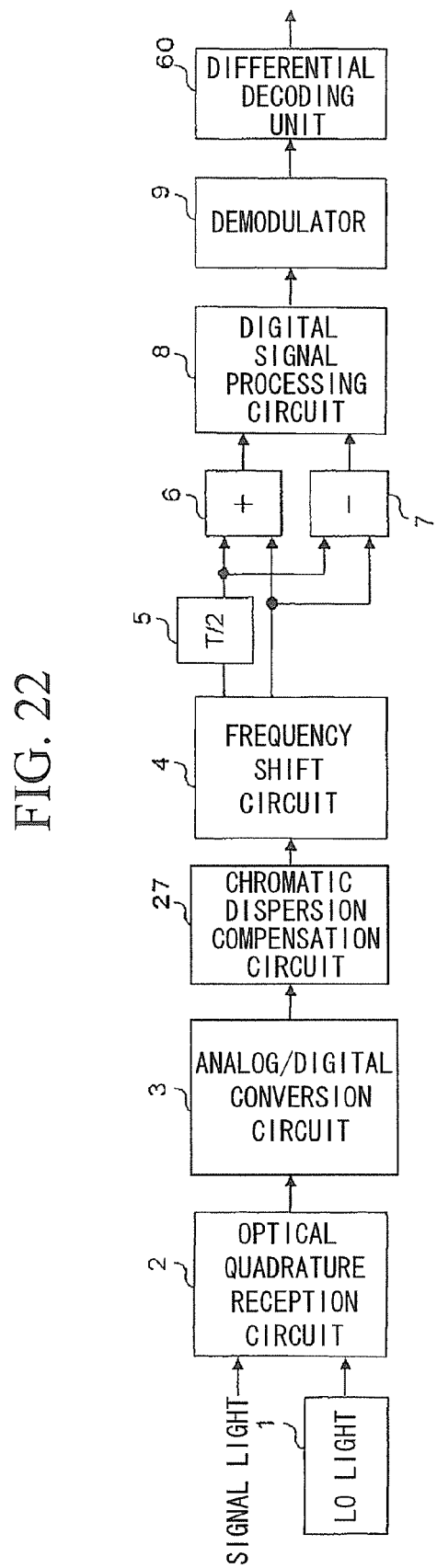
FIG. 22 is a block diagram showing the structure of an optical OFDM receiver in accordance with a fourteenth embodiment.

A thirteenth embodiment of the present invention will be explained with reference to FIG. 21. The present embodiment is characterized in that a dispersion measurement circuit 50 measures a chromatic dispersion amount of a transmission fiber from a signal which has been subjected to an analog/digital conversion, and sets the dispersion amount of a chromatic dispersion compensation circuit 27C based on its result.

An OFDM signal uses subcarriers having different frequencies (i.e., different wavelengths), and the propagation delay varies depending on the wavelength due to the influence of chromatic dispersion. For this reason, the present embodiment employs a structure of measuring this difference between delay times to obtain a chromatic dispersion amount. In order to realize this, for example, a scheme may be employed in which a dispersion measurement phase is provided in addition to a normal data transmission phase, and a test signal for measuring dispersion is transmitted from a transmitting side. In this case, the amplitudes and the phases of respective subcarriers are modulated with low-frequency clock signals (a frequency of f) which are synchronized between the respective subcarriers, and they are transmitted as the test signal. The receiving side detects a phase difference Δθ between any two sets of subcarriers (a wavelength interval of Δλ) to obtain the difference between the delay times, and measures chromatic dispersion. In this case, chromatic dispersion D can be obtained by $$D = (\Delta\theta / 2\pi f \Delta\lambda) \quad (3)$$

Moreover, instead of separately providing the data transmission phase and the dispersion measurement phase and transmitting a test signal, a scheme may be employed in which a low-frequency clock signal is superposed on a data signal, and this frequency component is extracted by a digital filter at a receiving side to measure a phase difference.

By measuring chromatic dispersion only at an OFDM receiver as in the present embodiment, it is not necessary to measure chromatic dispersion at the time of installing the system, and thus an improvement in convenience in managing the maintenance can be expected.

Fourteenth Embodiment of the Present Invention

A fourteenth embodiment of the present invention will be explained with reference to FIG. 22 to FIG. 25. The present embodiment is characterized in that a differential decoding unit 60 is provided which performs differential decoding on an output signal of a demodulator for each subcarrier.

If the propagation through optical fibers extends over a long distance, a modulation component which is proportional to the intensity of an optical signal is superposed on the phase of received signal light due to non-linear optical effects in the optical fibers. For this reason, there is a problem in that an error rate is rapidly deteriorated because the phase difference with LO light becomes unstable and a phase lock tends to be lost. Here, if the phase lock is lost, a reference phase is shifted and a phenomenon in which a burst error is generated tends to occur. Therefore, if an OFDM signal which has been differentially encoded with a DQPSK code or the like beforehand is used as a transmission signal, and differential decoding is applied to the output of a demodulator at the receiving side, a burst error can be prevented from being generated even if the reference phase is shifted because the phase difference with the immediately before symbol does not change.

Figure 23:
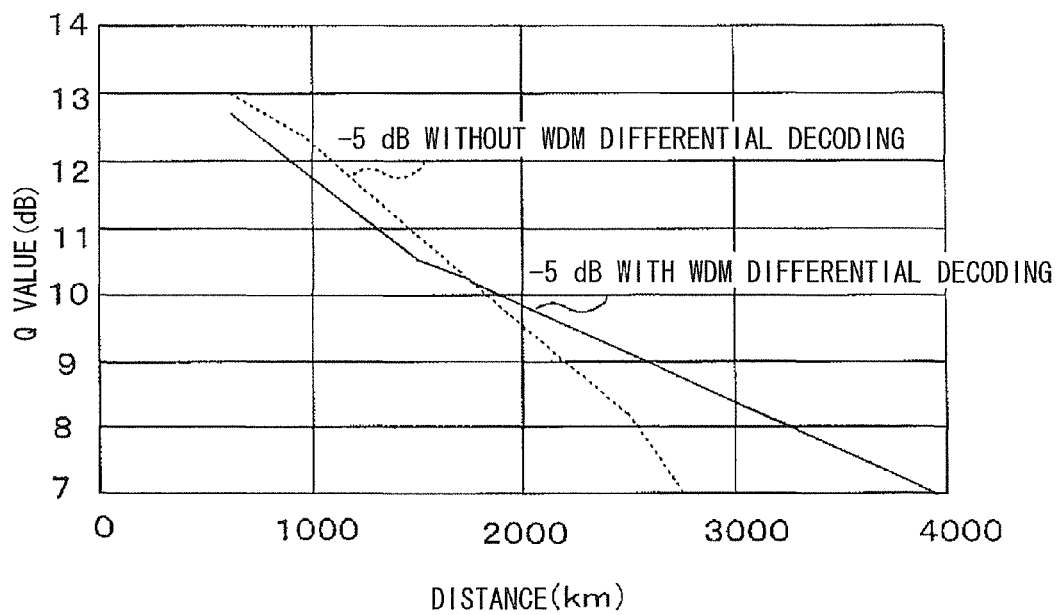
FIG. 23 is a diagram showing the measurement results of the dependence of a Q value on the transmission distance in the optical OFDM receiver shown in FIG. 22 when a polarization-division multiplexed two-subcarrier QPSK-OFDM signal having a wavelength of 1574.5 nm, a 50 GHz spacing, 10 wavelengths, and 111 Gbit/s is transmitted through dispersion-shifted fibers with linear repeating.

FIG. 23 shows the measurement results of the dependence of a Q value on the transmission distance when a polarization-division multiplexed two-subcarrier QPSK-OFDM signal having a wavelength of 1574.5 nm, a 50 GHz spacing, ten wavelengths, and 111 Gbit/s is transmitted through dispersion shifted fibers with linear repeating. In FIG. 23, the horizontal axis denotes a distance (km) and the vertical axis denotes a Q value (dB). It is noted that the dotted line graph corresponds to the case in which WDM transmission is performed with power of −5 dBm input to an optical fiber and without WDM differential decoding. Moreover, the solid line graph corresponds to the case in which WDM transmission is performed with power of −5 dBm input to an optical fiber and with WDM differential decoding.

In this example, the differential decoding is performed by calculating the difference from the preceding symbol for each subcarrier. Here, there is the following relationship between the Q value and a symbol error rate BER. It is noted erfc denotes a complementary error function.

$$BER = (1/2) erfc(Q/\sqrt{2}) \quad (4)$$

When differential decoding is not performed, the Q value is rapidly deteriorated (i.e., an error rate is deteriorated) due to the influence of non-linear optical effects with increasing transmission distance; whereas when differential decoding is performed, a deterioration in the Q-value is reduced, and a higher Q value is obtained in the range beyond 2,000 km when the differential encoding is performed.

Figure 24:
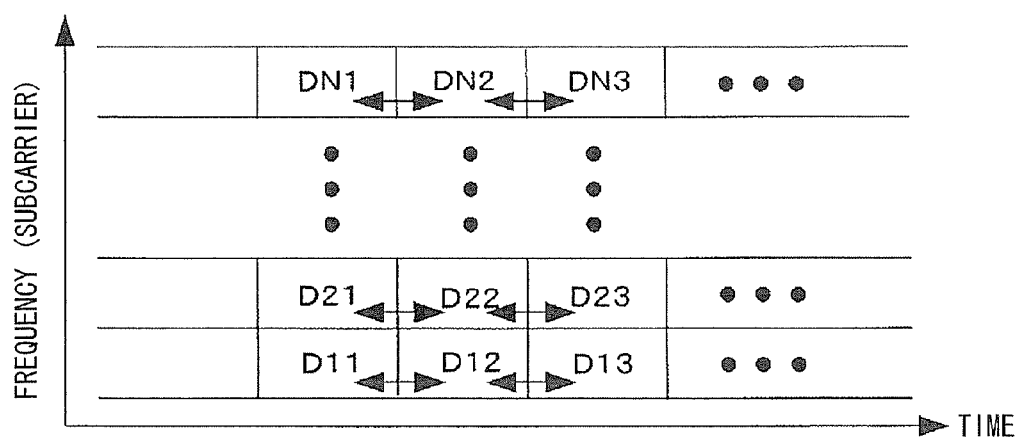
FIG. 24 is an explanatory diagram of a decoding scheme by the calculation of the difference from the preceding symbol for each subcarrier.
Figure 25:
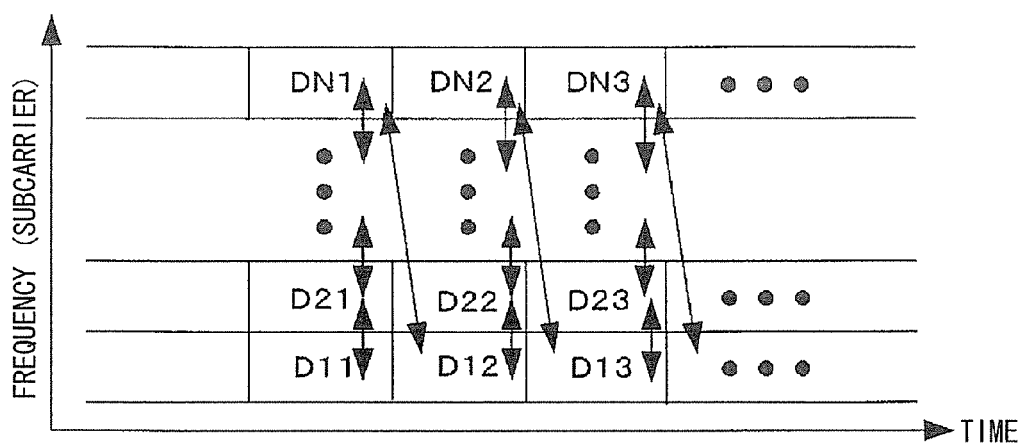
FIG. 25 is an explanatory diagram of a decoding scheme by the calculation of the differences between subcarriers within the same symbol.

It is noted that the foregoing example employs a scheme of calculating the difference from the preceding symbol for each subcarrier and performing decoding, as shown in FIG. 24. Since the frequency spacing between the subcarriers is small, phase shifts of the respective subcarriers caused by non-linear effects from other wavelengths have approximately the same phase shift amount. Therefore, it is effective to employ a scheme of calculating the differences between subcarriers within the same symbol and performing decoding as shown in FIG. 25 because the phase shifts due to non-linear optical effects can be cancelled.

As described above, the use of differential decoding makes it possible to suppress the generation of a burst error due to the influence of non-linear optical effects and to realize an increase in the transmission distance.

It is noted that in the foregoing embodiments, the structural elements provided between the frequency shift circuit(s) and the demodulator(s) (except for the sixth embodiment (FIG. 10) and the seventh embodiment (FIG. 11)) and the structural elements provided between the band limiting filters and the demodulators (in the case of the sixth embodiment and the seventh embodiment) correspond to various computation circuits of the present invention (a computation circuit, a first computation circuit, and a second computation circuit).

Moreover, in the foregoing embodiments, the circuits disposed as the previous stages of the circuit for performing an equalization process and a carrier phase recovery process correspond to the subcarrier separation circuit of the present invention. It is noted that the structure which has been explained in relation to FIG. 4C (i.e., the structure in which among the coefficients of the transversal filter-type equalizer included in the digital signal processing circuit 8, the coefficients of the oblique line portions in FIG. 4C are made small and the coefficients of the portions where only subcarrier A components appear are made large, to thereby extract the subcarrier A components as an output signal of the equalizer) may be incorporated into the subcarrier separation circuit of the present invention.

While embodiments of the present invention have been explained, the present invention is not limited to the above-described embodiments, and additions, omissions, substitutions, and other modifications of structures can be made without departing from the gist of the present invention.

For example, while the foregoing embodiments have been explained using optical quadrature reception circuit(s) as an example of optical reception circuit(s), subcarriers can be separated even if optical reception circuits other than optical quadrature reception circuits are used. Since the use of optical quadrature reception circuits results in small-sized circuits because an I-phase component and a Q-phase component can be extracted simultaneously, it is desirable to use optical quadrature reception circuits.

Moreover, for example, the foregoing embodiments may be combined with one another as appropriate. The present invention is not limited by the foregoing description, and is only limited by the appended claims.

INDUSTRIAL APPLICABILITY

The present invention is applicable to the realization of high-performance optical OFDM transmission systems.

The invention claimed is:

1. A subcarrier separation circuit which receives an optical OFDM signal consisting of N subcarriers, N being an integer greater than or equal to 2, and separates a subcarrier component, the subcarrier separation circuit comprising:
at least one system of optical reception circuits, received signal light and at least one system of local oscillator light being input to each optical reception circuit, each optical reception circuit converting the received signal light and the local oscillator light into a baseband electrical signal;
at least one system of analog/digital conversion circuits, each analog/digital conversion circuit converting the baseband electrical signal into a digital signal;
N systems of frequency shift circuits which shift the frequency of the converted digital signal so that a center frequency of a desired subcarrier becomes zero;
N systems of band limiting filters which limit bands of signals which have been subjected to the frequency shifting by the N systems of the frequency shift circuits, respectively, so that signals in the same pass band as a signal bandwidth of the desired subcarrier are passed therethrough; and
N systems of adders which add signals whose bands have been limited by the N systems of the band limiting filters to signals obtained by delaying the signals whose bands have been limited by ½ of a symbol time, to separate components of the N subcarriers.

2. The subcarrier separation circuit according to claim 1, wherein the at least one system of the local oscillator light is N systems of local oscillator light, the at least one system of the optical reception circuits are N systems of optical reception circuits to which the received signal light and the N systems of the local oscillator light are respectively input and which respectively convert the received signal light and the local oscillator light into baseband electrical signals, the at least one system of the analog/digital conversion circuits are N systems of analog/digital conversion circuits which respectively convert the baseband electrical signals respectively output from the N systems of the optical reception circuits into digital signals, and the N systems of the frequency shift circuits shift the frequencies of the digital signals respectively converted by the N systems of the analog/digital conversion circuits so that the center frequency of the desired subcarrier becomes zero.

3. An optical OFDM receiver comprising:
the subcarrier separation circuit according to claim 2;
N systems of digital signal processing circuits which respectively perform an equalization process and a carrier phase recovery process on components of the N subcarriers; and
N systems of demodulators which perform demodulation on signals obtained by the equalization process and the carrier phase recovery process performed by the N systems of digital signal processing circuits, respectively.

4. The optical OFDM receiver according to claim 3, wherein the N systems of the local oscillator light are set to center frequencies of desired subcarriers for the respective N systems of the optical reception circuits, or to optical frequencies in frequency ranges so that the respective N systems of the digital signal processing circuits which perform the equalization process and the carrier phase recovery process are respectively capable of correcting the optical frequencies in the frequency ranges to the center optical frequencies of the desired subcarriers.

5. The optical OFDM receiver according to claim 4, wherein the signal light is a polarization-division multiplexed signal, each optical reception circuit is a polarization diversity-type optical reception circuit, each analog/digital conversion circuit is configured by two sets of analog/digital conversion circuits for a X-polarization signal and a Y-polarization signal, and each demodulator performs demodulation for the X-polarization signal and the Y-polarization signal.

6. The optical OFDM receiver according to claim 4, further comprising a chromatic dispersion compensation circuit which compensates for chromatic dispersion of a transmission line by digital signal processing on a digital signal converted by each analog/digital conversion circuit.

7. An optical transmission system comprising the optical OFDM receiver according to claim 4.

8. A subcarrier separation circuit which receives an optical OFDM signal consisting of two subcarriers A and B and separates a subcarrier component, the subcarrier separation circuit comprising:

a first optical reception circuit to which signal light and first local oscillator light are input and which converts the signal light and the first local oscillator into a baseband electrical signal;

a first analog/digital conversion circuit which converts the baseband electrical signal into a digital signal;

a first frequency shift circuit which shifts the frequency of the converted digital signal so that a center frequency of the subcarrier A becomes zero; and a first computation circuit which adds a frequency shifted signal to a signal obtained by delaying the frequency shifted signal by ½ of a symbol time to separate a component of the subcarrier A.

9. The subcarrier separation circuit according to claim 8, wherein the first computation circuit comprises:

a delay element which delays the frequency shifted signal by ½ of a symbol time; and an adder which adds the frequency shifted signal to the signal obtained by delaying the frequency shifted signal by ½ of a symbol time to separate the component of the subcarrier A.

10. An optical OFDM receiver comprising:
the subcarrier separation circuit according to claim 9; and
a first demodulator,
wherein the first computation circuit performs an equalization process and a carrier phase recovery process on the separated component of the subcarrier A, and the first demodulator performs demodulation on a signal obtained by the equalization process and the carrier phase recovery process performed by the first computation circuit.

11. The optical OFDM receiver according to claim 10, wherein the first local oscillator light is set to the optical frequency of the subcarrier A or B, or to an optical frequency in a frequency range so that each computation circuit which performs the equalization process and the carrier phase recovery process is capable of correcting the optical frequency in the frequency range to the optical frequency of the subcarrier A or B.

12. The optical OFDM receiver according to claim 10, wherein the first computation circuit is a digital signal processing circuit which comprises:

an equalizer configured by a transversal filter; and
a setting unit which performs setting to a first mode in which coefficients of the transversal filter are set so that an input signal to the first computation circuit is added to a signal obtained by delaying the input signal by ½ of a symbol time.

13. The optical OFDM receiver according to claim 12, wherein the setting unit selects any one of the first mode and a second mode in which setting is performed so as to subtract, from the input signal to the first computation circuit, the signal obtained by delaying the input signal by ½ of a symbol time, and the first demodulator obtains a signal of the subcarrier A when the first mode is set, and obtains a signal of the subcarrier B when the second mode is set.

14. The subcarrier separation circuit according to claim 8, wherein, in addition to the addition, the first computation circuit further subtracts the signal obtained by delaying the frequency shifted signal by ½ of a symbol time from the frequency shifted signal to separate a component of the subcarrier B.

15. An optical OFDM receiver comprising:
the subcarrier separation circuit according to claim 14; and
a first demodulator,
wherein the first computation circuit performs an equalization process and a carrier phase recovery process on the separated component of the subcarrier B, and the first demodulator performs demodulation on a signal obtained by the equalization process and the carrier phase recovery process performed by the first computation circuit.

16. The subcarrier separation circuit according to claim 8, further comprising:
a second frequency shift circuit which shift the frequency of the digital signal converted by the first analog/digital conversion circuit so that a center frequency of the subcarrier B becomes zero; and
a second computation circuit which adds the frequency shifted signal to the signal obtained by delaying the frequency shifted signal by ½ of a symbol time to separate a component of the subcarrier B.

17. An optical OFDM receiver comprising:
the subcarrier separation circuit according to claim 16; and
a second demodulator,
wherein the second computation circuit performs an equalization process and a carrier phase recovery process on the separated component of the subcarrier B, and
the second demodulator performs demodulation on a signal obtained by the equalization process and the carrier phase recovery process performed by the second computation circuit.

18. The optical OFDM receiver according to claim 17, wherein the first local oscillator light is set to a center optical frequency between the subcarrier A and the subcarrier B, or to an optical frequency in a frequency range so that each computation circuit which performs the equalization process and the carrier phase recovery process is capable of correcting the optical frequency in the frequency range to the center optical frequency between the subcarrier A and the subcarrier B.

19. The subcarrier separation circuit according to claim 8, further comprising:
a second optical reception circuit to which the received signal light and second local oscillator light are input and which converts the received signal light and the second local oscillator into a baseband electrical signal;
a second analog/digital conversion circuit which converts the baseband electrical signal output from the second optical reception circuit into a digital signal;
a second frequency shift circuit which shifts the frequency of the digital signal converted by the second analog/digital conversion circuit so that a center frequency of the subcarrier B becomes zero; and
a second computation circuit which adds a signal which has been subjected to the frequency shifting by the second frequency shift circuit and a signal obtained by delaying the signal which has been subjected to the frequency shifting by the second frequency shift circuit by ½ of a symbol time to separate a component of the subcarrier B.

20. An optical OFDM receiver comprising:
the subcarrier separation circuit according to claim 19; and
a second demodulator,
wherein the second computation circuit performs an equalization process and a carrier phase recovery process on the separated component of the subcarrier B, and
the second demodulator performs demodulation on a signal obtained by the equalization process and the carrier phase recovery process performed by the second computation circuit.

21. The optical OFDM receiver according to claim 20, wherein the first computation circuit performs an equalization process and a carrier phase recovery process on the separated component of the subcarrier A, and
the first optical reception circuit sets the first local oscillator light to a center optical frequency of the subcarrier A, or to an optical frequency in a frequency range so that the first computation circuit which performs the equalization process and the carrier phase recovery process is capable of correcting the optical frequency in the frequency range to the center optical frequency of the subcarrier A, and the second optical reception circuit sets the second local oscillator light to a center optical frequency of the subcarrier B, or to an optical frequency in a frequency range so that the second computation circuit which performs the equalization process and the carrier phase recovery process is capable of correcting the optical frequency in the frequency range to the center optical frequency of the subcarrier B.

22. A subcarrier separating method which receives an optical OFDM signal consisting of two subcarriers A and B and separates a subcarrier component, the method comprising:
receiving received signal light and local oscillator light and converting the received signal light and the local oscillator light into a baseband electrical signal;
converting the baseband electrical signal into a digital signal;
shifting the frequency of the converted digital signal so that a center frequency of the subcarrier A becomes zero; and
adding a frequency shifted signal to a signal obtained by delaying the frequency shifted signal by ½ of a symbol time to separate a component of the subcarrier A.

* * * * *